United States Patent
Mori

(10) Patent No.: US 12,535,503 B2
(45) Date of Patent: Jan. 27, 2026

(54) SEMICONDUCTOR WAFER TESTING APPARATUS, SEMICONDUCTOR WAFER TESTING SYSTEM, FLATNESS MEASURING DEVICE, AND METHOD OF ADJUSTING FLATNESS OF WIRING BOARD

(71) Applicant: ADVANTEST Corporation, Tokyo (JP)

(72) Inventor: Yuto Mori, Tokyo (JP)

(73) Assignee: ADVANTEST Corporation, Tokyo (JP)

( * ) Notice: Subject to any disclaimer, the term of this patent is extended or adjusted under 35 U.S.C. 154(b) by 199 days.

(21) Appl. No.: 18/278,813

(22) PCT Filed: Feb. 24, 2021

(86) PCT No.: PCT/JP2021/006926
§ 371 (c)(1),
(2) Date: Aug. 24, 2023

(87) PCT Pub. No.: WO2022/180700
PCT Pub. Date: Sep. 1, 2022

(65) Prior Publication Data
US 2024/0302411 A1  Sep. 12, 2024

(51) Int. Cl.
*G01R 1/073* (2006.01)
*G01B 21/30* (2006.01)
(Continued)

(52) U.S. Cl.
CPC ......... *G01R 1/07342* (2013.01); *G01B 21/30* (2013.01)

(58) Field of Classification Search
CPC . G01R 1/02; G01R 1/04; G01R 1/067; G01R 1/073; G01R 31/28; G01B 21/30; H01L 21/66
See application file for complete search history.

(56) References Cited

U.S. PATENT DOCUMENTS 6,441,629 B1  8/2002 Khoury et al.
2002/0050832 A1  5/2002 Aldaz et al.
(Continued)

FOREIGN PATENT DOCUMENTS

JP  2003-528459 A  9/2003
JP  2007-538263 A  12/2007
(Continued)

OTHER PUBLICATIONS

Notice of Reasons for Refusal issued in corresponding Japanese Application No. 2023-501728 mailed Aug. 20, 2024 (8 pages).
(Continued)

*Primary Examiner* — Neel D Shah
(74) *Attorney, Agent, or Firm* — Osha Bergman Watanabe & Burton LLP

(57) ABSTRACT

A semiconductor wafer testing apparatus tests a device under test (DUT) on a semiconductor wafer. The semiconductor wafer testing apparatus includes a first wiring board including first connectors and that is electrically connected to a probe card having probes that contact the DUT, second wiring boards each including a second connector configured to be fitted to a respective one of the first connectors, and adjusting mechanisms that adjust a flatness of the first wiring board by changing a position of the second wiring boards along a normal direction of the first wiring board when the first connectors are fitted to the second connectors.

16 Claims, 16 Drawing Sheets

(51) Int. Cl.
*G01R 1/04* (2006.01)
*G01R 1/067* (2006.01)
*G01R 31/28* (2006.01)
*H01L 21/66* (2006.01)

(56) References Cited

U.S. PATENT DOCUMENTS

| | | | |
|---|---|---|---|
| 2002/0057098 A1 | 5/2002 | Aldaz et al. | |
| 2003/0080763 A1 | 5/2003 | Yu et al. | |
| 2003/0080764 A1 | 5/2003 | Zhou et al. | |
| 2010/0026333 A1* | 2/2010 | Shouji | G01R 31/2889 324/756.03 |
| 2010/0301889 A1* | 12/2010 | Sakata | G01R 31/2889 324/756.07 |
| 2020/0018790 A1* | 1/2020 | Kanosue | G01R 31/2863 |

FOREIGN PATENT DOCUMENTS

| | | |
|---|---|---|
| JP | 2013-504050 A | 2/2013 |
| JP | 2017-513014 A | 5/2017 |
| JP | 2020-009978 A | 1/2020 |
| KR | 20010109164 A | 12/2001 |
| KR | 20200007659 A | 1/2020 |
| WO | 2011064847 A1 | 6/2011 |

OTHER PUBLICATIONS

International Search Report issued in corresponding International Application No. PCT/JP2021/006926 mailed May 11, 2021 (5 pages).
Written Opinion issued in corresponding International Application No. PCT/JP2021/006926 mailed May 11, 2021 (4 pages).
Office Action issued in Korean Application No. 10-2023-7026684, Dated Mar. 24, 2025 (9 pages).

\* cited by examiner

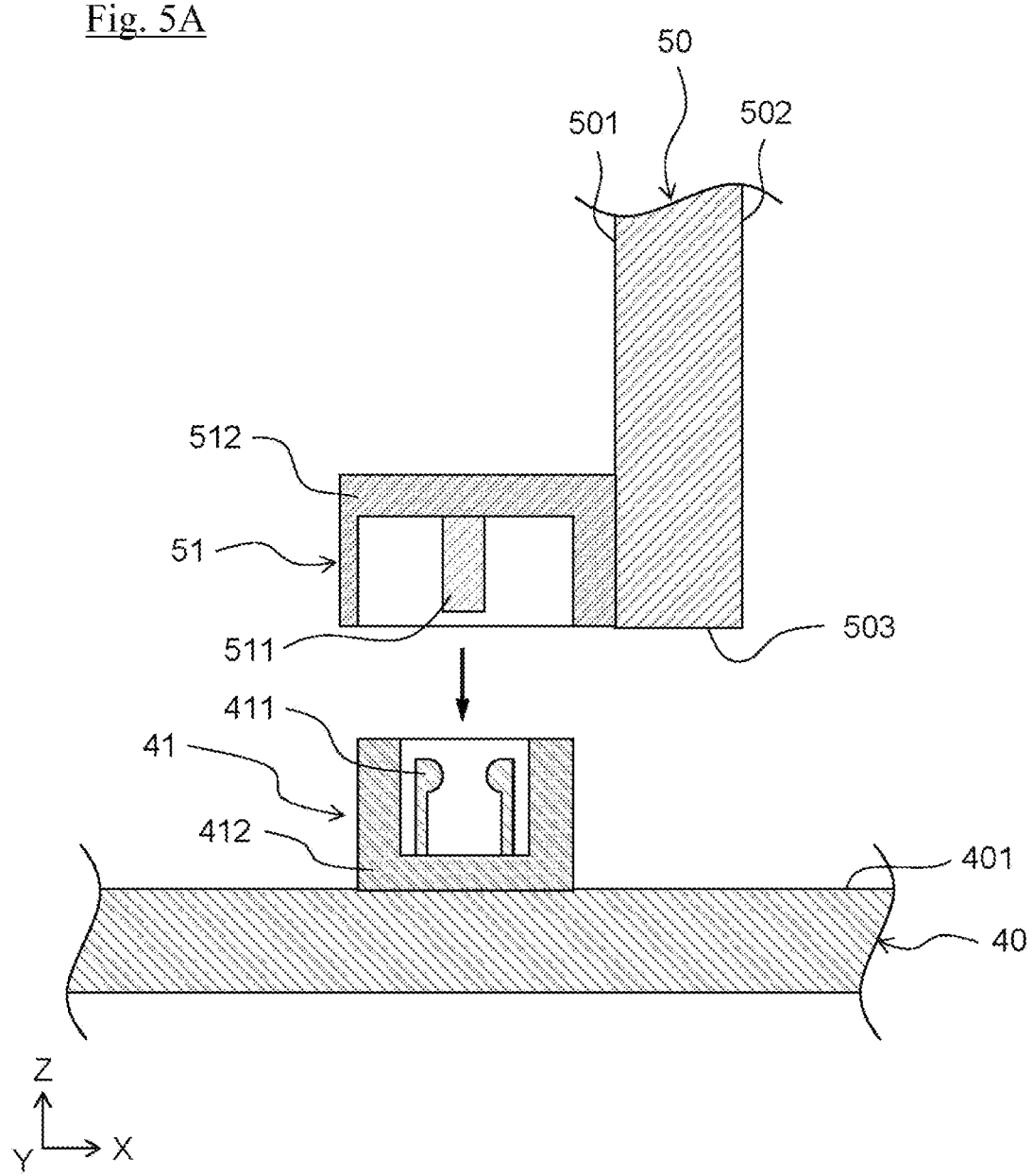

SEMICONDUCTOR WAFER TESTING APPARATUS, SEMICONDUCTOR WAFER TESTING SYSTEM, FLATNESS MEASURING DEVICE, AND METHOD OF ADJUSTING FLATNESS OF WIRING BOARD

BACKGROUND

Technical Field

The present invention relates to a semiconductor wafer testing apparatus that tests an electronic component under test (DUT: Device Under Test) such as a semiconductor integrated circuit device formed on a semiconductor wafer, a semiconductor wafer testing system including the semiconductor wafer testing apparatus, a flatness measuring device that measuring a flatness of a wiring board provided in the semiconductor wafer testing apparatus, and a method of adjusting the flatness of the wiring board.

Description of the Related Art

A conventional probe card assembly includes a spatial transformer having elastic contact structures on its bottom surface that contacts pads of a semiconductor device formed on a semiconductor wafer, a printed wiring board, an interposer between the spatial transformer and the printed wiring board, and a dedicated flattening device for adjusting the flatness of the spatial transformer (refer to, for example, Patent Document 1).

PATENT DOCUMENT

PATENT DOCUMENT 1: JP 2003-528459 A1

When deformation such as deflection occurs in the printed wiring board, a contact failure may occur between the printed wiring board and the interposer, or the elastic contact structure may be displaced with respect to the pad of the semiconductor device, therefore the test of the semiconductor wafer may be affected. On the other hand, if the probe card assembly includes a dedicated flattening device as described above, a space on the printed wiring board where a connector or the like can be mounted is limited.

One or more embodiments provide a semiconductor wafer testing apparatus capable of adjusting the flatness of the wiring board without limiting the space on the wiring board. Further, one or more embodiments provide a semiconductor wafer testing system including the semiconductor wafer testing apparatus, a flatness measuring device that measuring the flatness of the wiring board provided in the semiconductor wafer testing apparatus, and a method of adjusting the flatness of the wiring board.

SUMMARY

A semiconductor wafer testing apparatus according to one or more embodiments is a semiconductor wafer testing apparatus that tests a device under test (DUT) formed on a semiconductor wafer, the semiconductor wafer testing apparatus comprising: a first wiring board having first connectors and electrically connectable to a probe card having probes contacting the DUT; second wiring boards each of which has a second connector fitted to each of the first connectors; and adjusting mechanisms that adjust a flatness of the first wiring board by changing a position of the second wiring board along a first direction in a state where the first connector and the second connector are fitted to each other, the first direction being a normal direction of the first wiring board.

In one or more embodiments, the first direction may be a direction substantially parallel to a vertical direction.

In one or more embodiments, the first wiring board may extend along a second direction substantially perpendicular to the first direction, the second wiring boards may extend along a direction substantially parallel to the first direction, and a fitting direction of the first connector and the second connector may be a direction substantially parallel to the first direction.

In one or more embodiments, the second wiring boards may be disposed at intervals along a second direction that is an extending direction of the first wiring board, and the second wiring boards may be disposed in parallel to each other.

In one or more embodiments, each of the second wiring boards may have a plurality of second connectors including the second connector.

In one or more embodiments, the first connector may be a straight type connector mounted on a second main surface of the first wiring board opposite to a first main surface on a probe card side, and the second connector may be a right angle type connector mounted on a third surface or a fourth surface of the second wiring board.

In one or more embodiments, each of the adjusting mechanisms may comprise: a supporting body to which the first wiring board is fixed; a holding member disposed along a second edge of the second wiring board opposite to a first edge on a first wiring side and held by the supporting body; a fixed member fixed to the second wiring board and having a female thread portion; and an adjusting screw that has a male thread portion screwed with the female thread portion of the fixed member, is inserted into a through hole of the holding member, and is held by the holding member, and a relative position of the second wiring board with respect to the holding member along the first direction may be changed by rotating the adjusting screw.

In one or more embodiments, the semiconductor wafer testing apparatus may comprise: a driving device that drives the adjusting mechanisms; and a controller that controls the driving device.

In one or more embodiments, the semiconductor wafer testing apparatus may comprise: a flatness measuring device that measures a flatness of a first surface of the first wiring board on a probe card side, the controller may control the driving device based on the flatness measured by the flatness measuring device.

In one or more embodiments, the flatness measuring device may comprise: a coordinate measuring unit (example of a measuring instrument) that coordinate values along the first direction at a plurality of positions on the first main surface of the first wiring board; and a calculator that calculates differences of the coordinate values with respect to a reference plane as the flatness.

A semiconductor wafer testing system according to one or more embodiments is a semiconductor wafer testing system comprising: the above semiconductor wafer testing apparatus; a probe card having probes contacting a device under test (DUT) formed on a semiconductor wafer and electrically connected to a first wiring board of the semiconductor wafer testing apparatus; and a prober that makes the semiconductor wafer face the probe card and presses the semiconductor wafer against the probe card.

A flatness measuring device according to one or more embodiments is a flatness measuring device that measures a flatness of a first wiring board electrically connectable to a probe card having probes contacting a device under test (DUT) formed on a semiconductor wafer, wherein the first wiring board has first connectors each of which is fitted to a second connector that each of second wiring boards has, and the flatness measuring device measures a flatness of a first main surface of the first wiring board on a probe card side in a state where the first connector and the second connector are fitted to each other.

In one or more embodiments, the flatness measuring device may comprise: a coordinate measuring unit (example of a measuring instrument) that coordinate values along a first direction at a plurality of positions on a first main surface of the first wiring board; and a calculator that calculates differences of the coordinate values with respect to a reference plane as the flatness, and the first direction may be a normal direction of the first wiring board.

In one or more embodiments, the first direction may be a direction substantially parallel to a vertical direction.

A semiconductor wafer testing system according to one or more embodiments is a semiconductor wafer testing system comprising: the above semiconductor wafer testing apparatus; the above flatness measuring device; a probe card having probes contacting a device under test (DUT) formed on a semiconductor wafer and electrically connected to a first wiring board of the semiconductor wafer testing apparatus; and a prober that makes the semiconductor wafer face the probe card and presses the semiconductor wafer against the probe card.

A method of adjusting a flatness according to one or more embodiments is a method of adjusting a flatness of a first wiring board electrically connectable to a probe card having probes contacting a device under test (DUT) formed on a semiconductor wafer, the method comprising: a preparing step of preparing the first wiring board having first connectors and second wiring boards each of which has a second connector fitted to each of the first connectors; and an adjusting step of adjusting the flatness of the first wiring board by changing a position of the second wiring board along a first direction in a state where the first connector and the second connector are fitted to each other, the first direction being a normal direction of the first wiring board.

In one or more embodiments, the method may comprise: a measuring step of measuring a flatness of a first main surface of the first wiring board on a probe card side, and the adjusting step may include changing the position of the second wiring board along the first direction based on a measuring result of the measuring step.

A method of adjusting a flatness according to one or more embodiments is a method of adjusting a flatness of a first wiring board in the above semiconductor wafer testing apparatus, the method comprising: a preparing step of preparing the first wiring board having first connectors and second wiring boards each of which has a second connector fitted to each of the first connectors; and an adjusting step of adjusting the flatness of the first wiring board by changing a position of the second wiring board along the first direction in a state where the first connector and the second connector are fitted to each other, wherein the adjusting step includes changing a relative position of the second wiring board with respect to the holding member along the first direction is changed by rotating the adjusting screw.

In one or more embodiments, the adjusting step may include rotating the adjusting screw until the fixed member abuts against the holding member or an interposed member interposed between the holding member and the fixed member.

In one or more embodiments, the first direction may be a direction substantially parallel to a vertical direction.

According to one or more embodiments, the semiconductor wafer testing apparatus includes a plurality of adjusting mechanisms that change the position of the second wiring board along the first direction in a state where the first and second connectors are fitted to each other, and the flatness of the first wiring board can be adjusted by using the first connector mounted on the first wiring board. Therefore, it is possible to adjust the flatness of the first wiring board without limiting the space on the first wiring board.

BRIEF DESCRIPTION OF THE DRAWINGS

FIG. 5A is a cross-sectional view showing the connectors mounted on the mother board and the daughter board in the first example and is a diagram showing the state before the connectors are fitted to each other.

DESCRIPTION OF THE EMBODIMENTS

Hereinafter, embodiments will be described with reference to the drawings.

First Example

Figure 1:
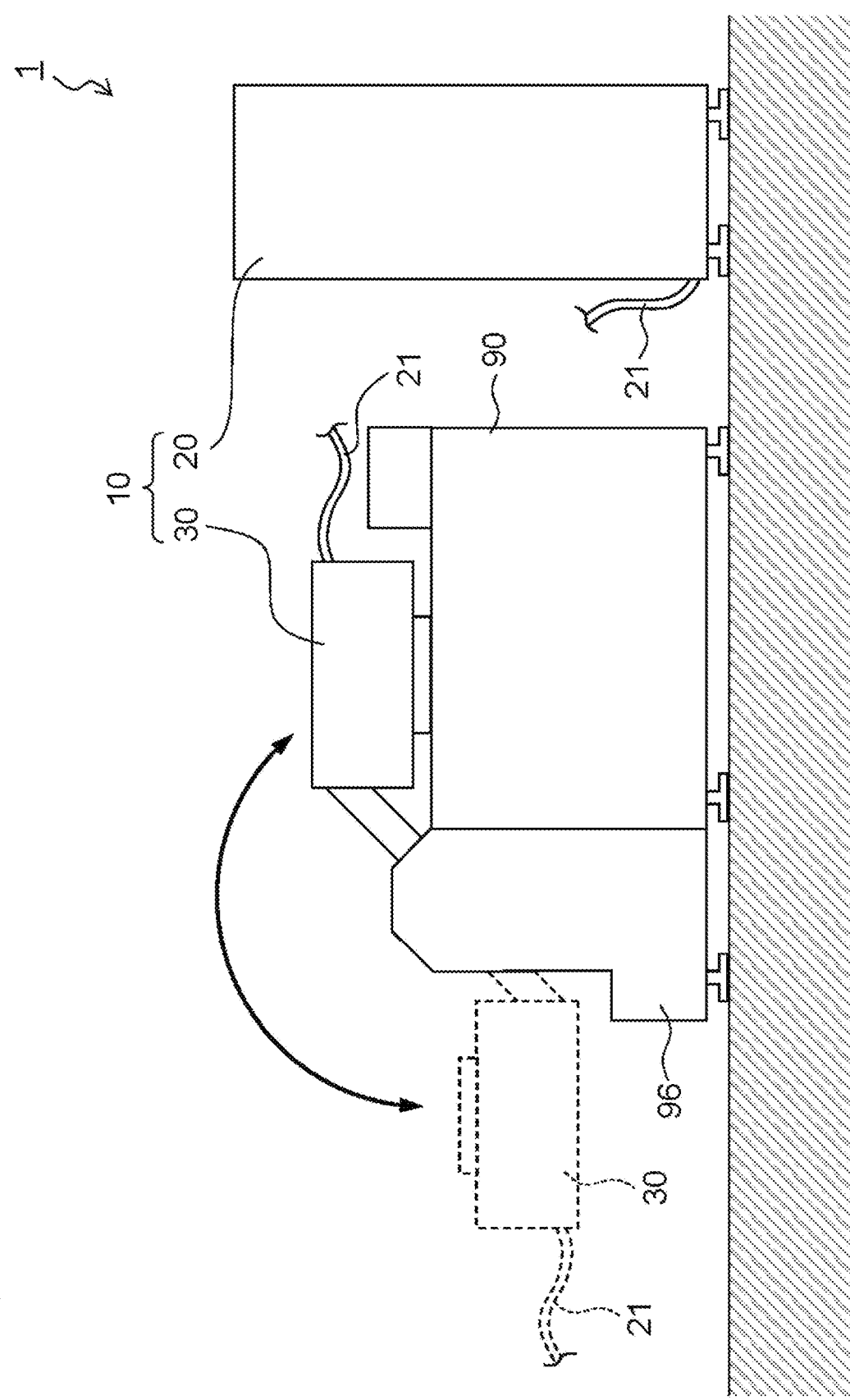
FIG. 1 is a schematic diagram showing the semiconductor wafer testing system in a first example of one or more embodiments.

FIG. 1 is a schematic diagram showing the semiconductor wafer testing system in one or more embodiments.

Figure 2:
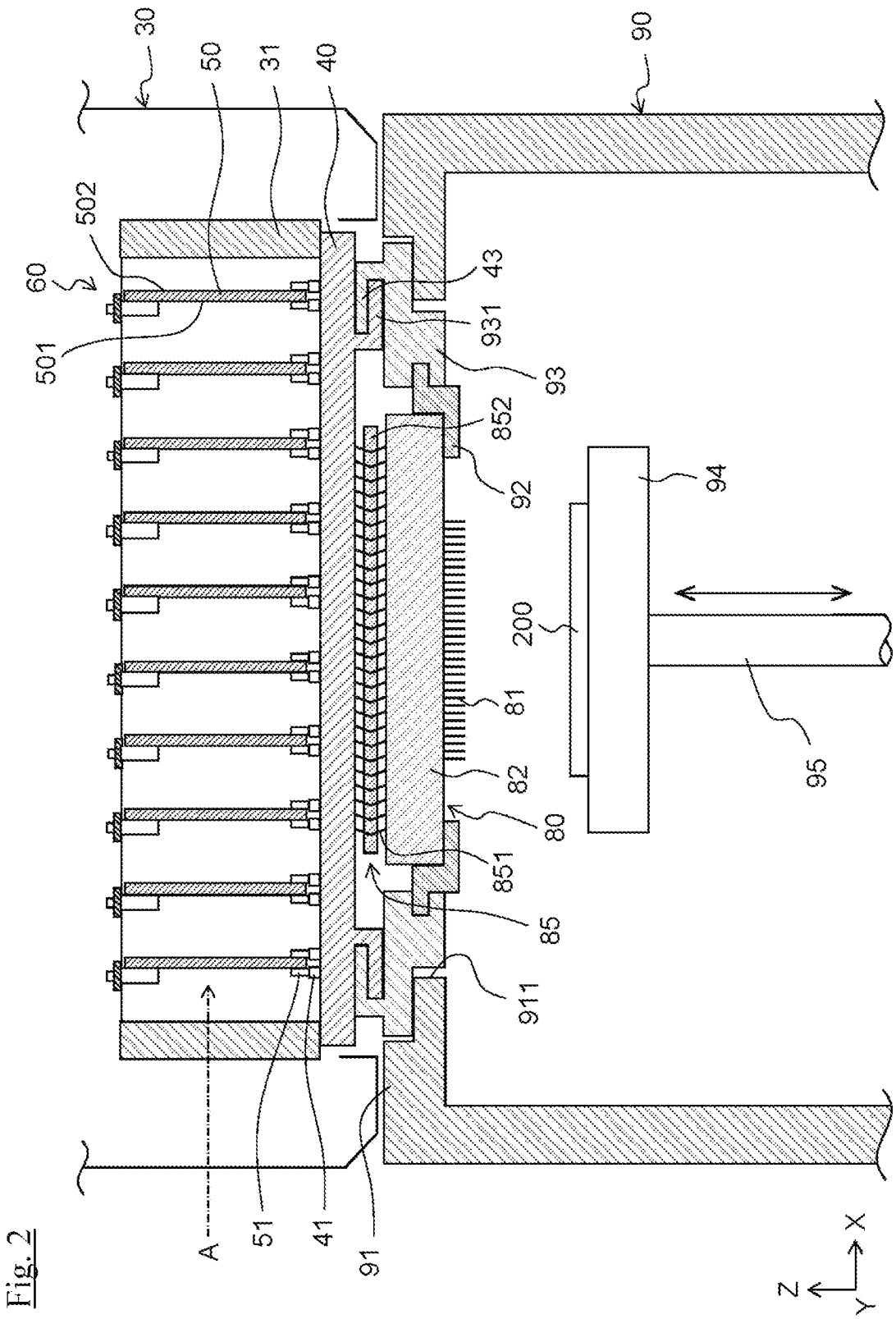
FIG. 2 is a cross-sectional view showing the connection portion between the test head and the prober in the first example.

As shown in FIG. 1, the semiconductor wafer testing system 1 of one or more embodiments is a system for testing a DUT such as IC device formed on the semiconductor wafer 200 (refer to FIG. 2). The semiconductor wafer testing system 1 includes the semiconductor wafer testing apparatus 10, a probe card 80, and a prober 90. The semiconductor wafer testing apparatus 10 includes a tester 20 and a test head 30, and the tester 20 is electrically connected to the test head 30 via a cable 21. When testing the DUT formed on the wafer 200, the test head 30 is inverted from the maintenance position (the position indicated by a broken line in FIG. 1) by the manipulator 96 and disposed above the prober 90.

Figure 3:
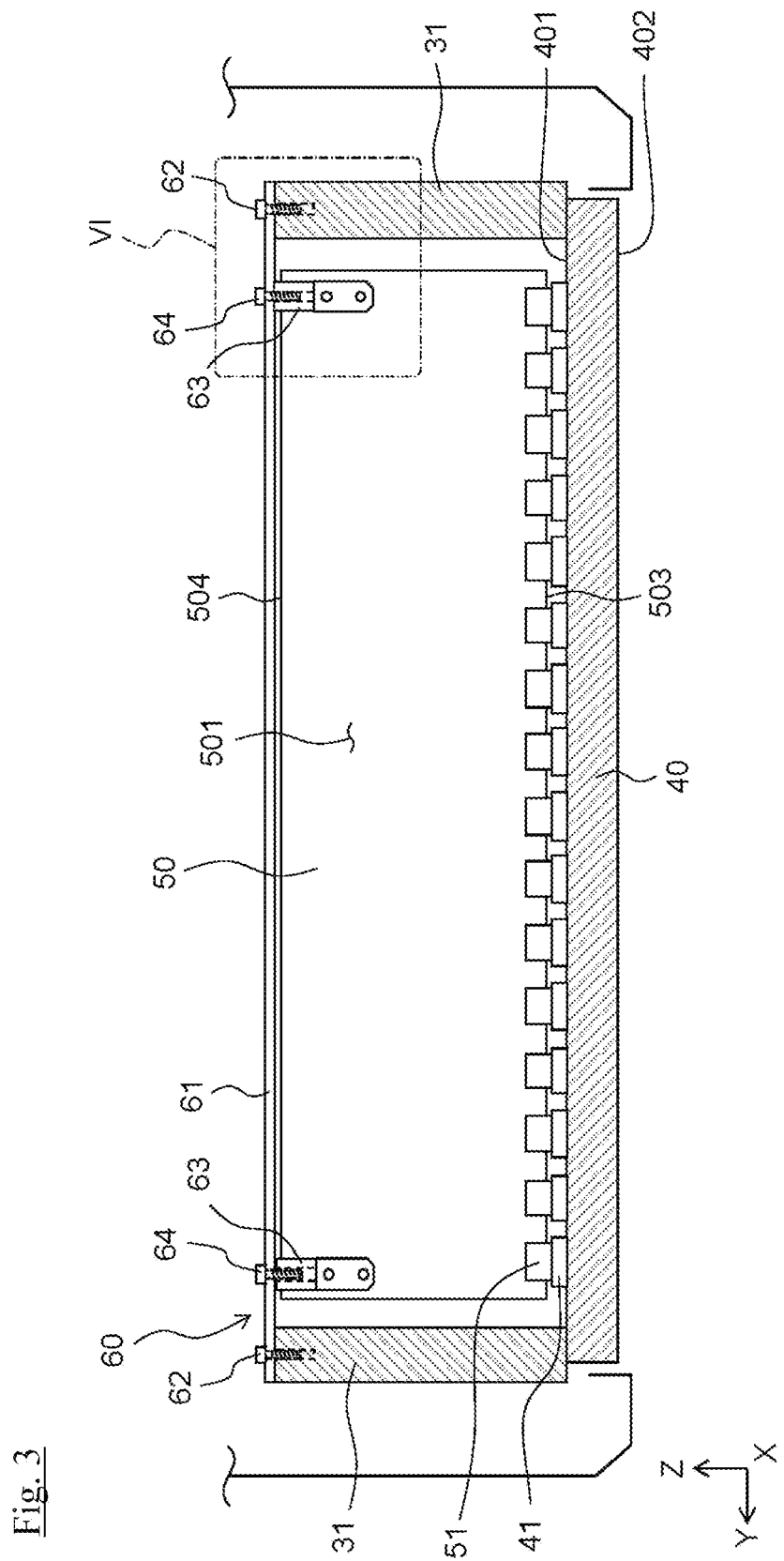
FIG. 3 is a cross-sectional view showing the internal structure of the test head in the first example and is a view viewed along the direction A of FIG. 2.
Figure 4A:
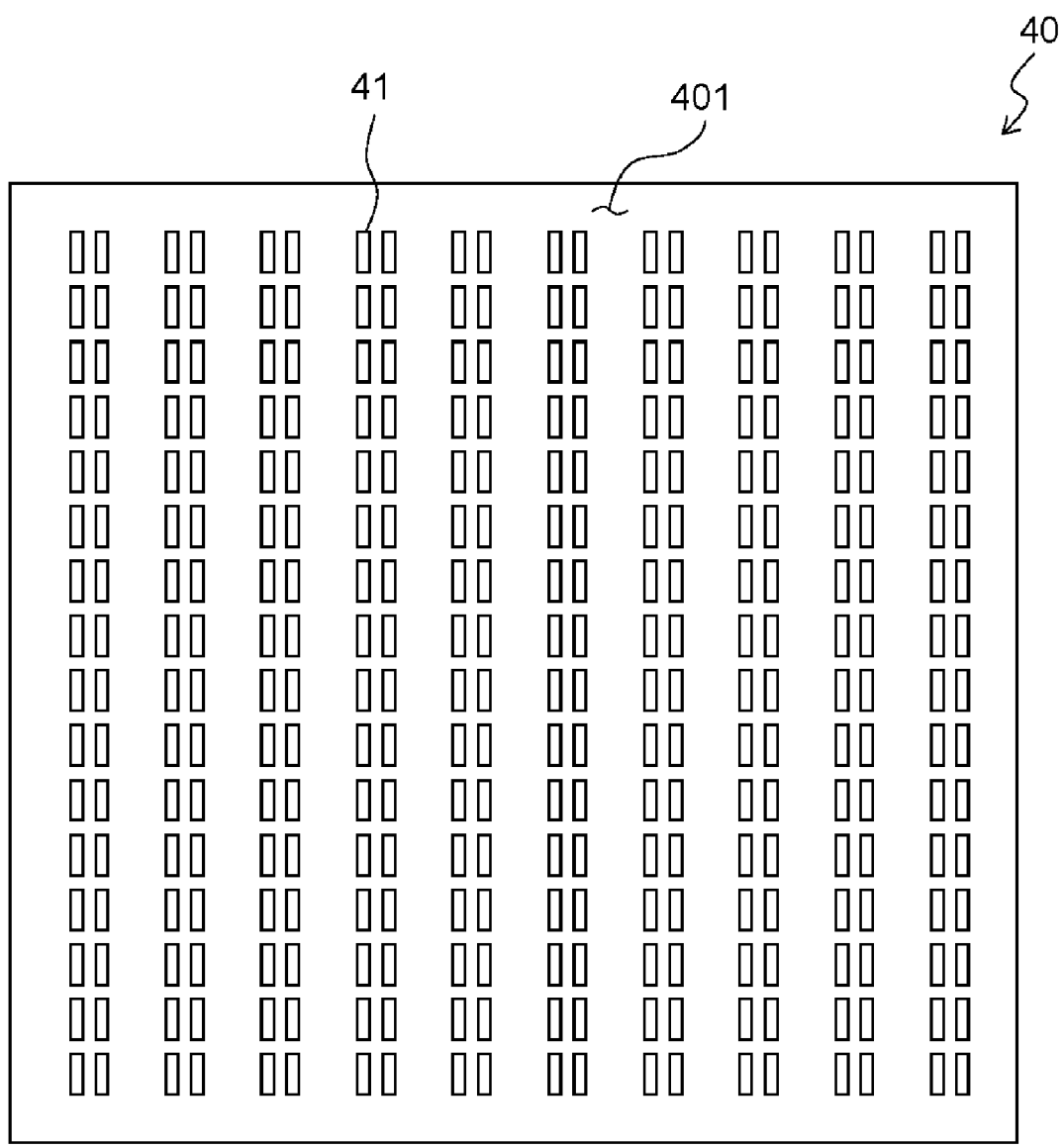
FIG. 4A is a plan view showing the mother board in the first example.
Figure 4B:
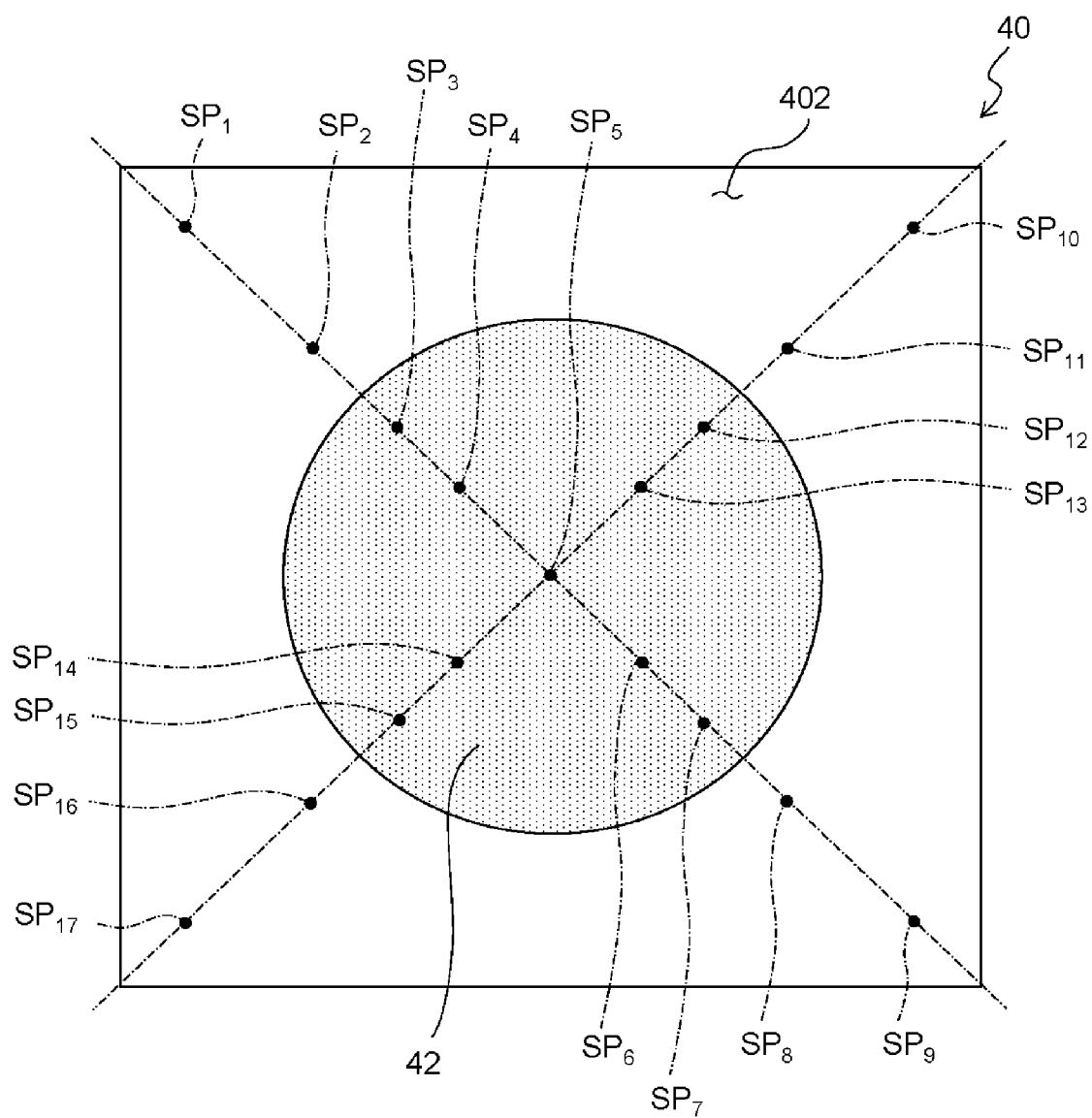
FIG. 4B is a bottom view showing the mother board in the first example and is a diagram showing the measuring point on the mother board.
Figure 5B:
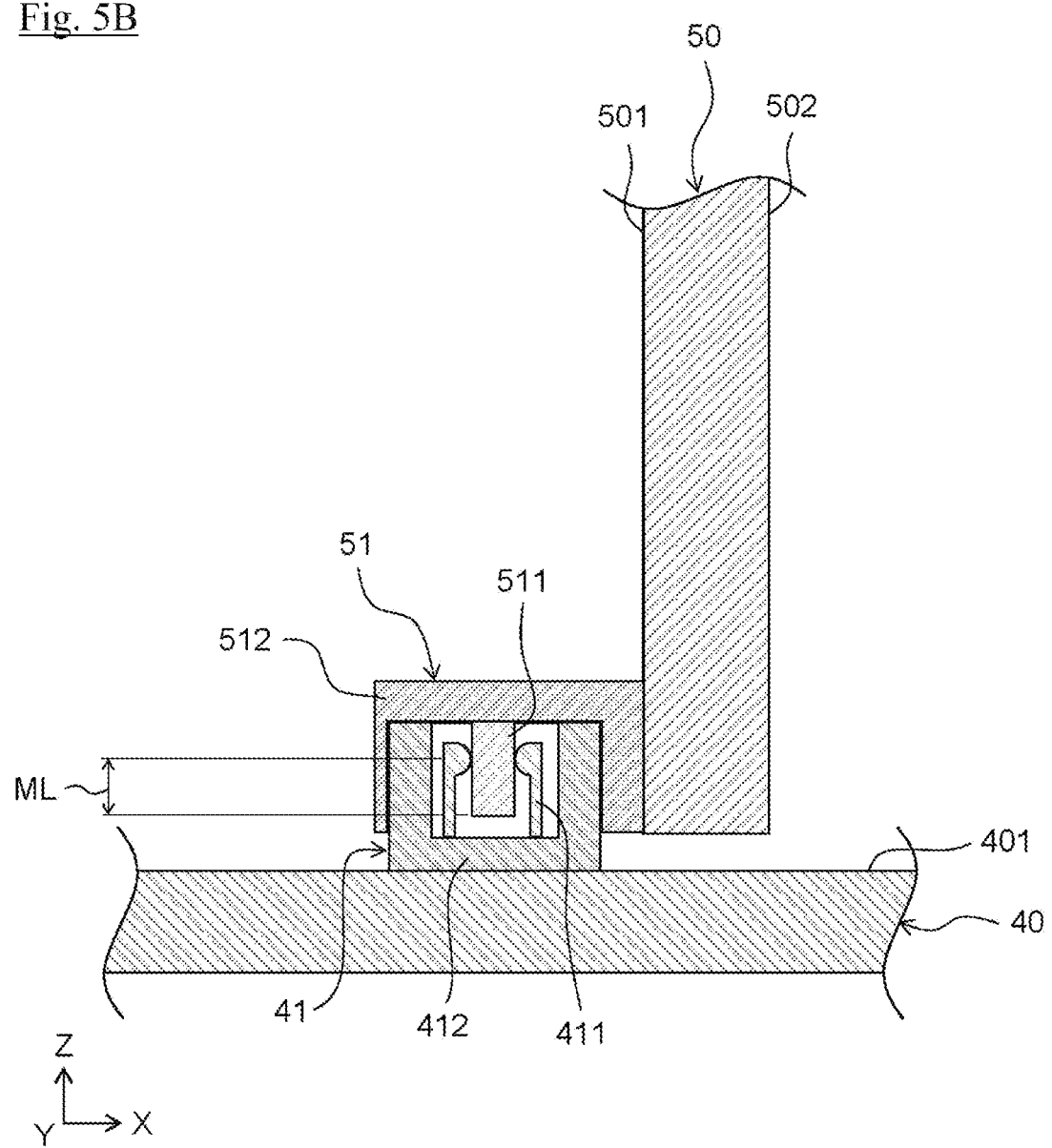
FIG. 5B is a cross-sectional view showing the connectors mounted on the mother board and the daughter board in the first example and is a diagram showing the state after the connectors are fitted to each other.
Figure 6:
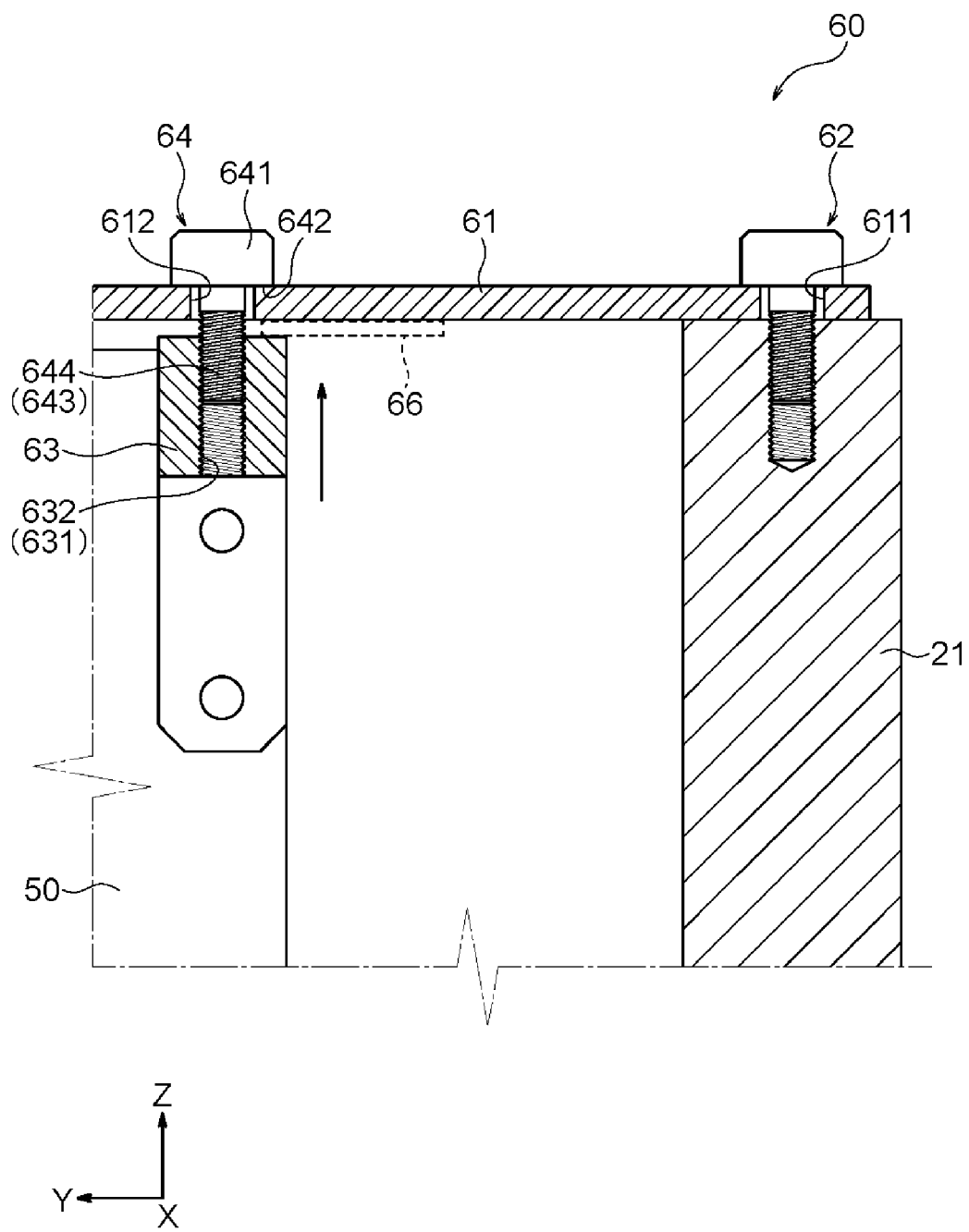
FIG. 6 is an enlarged cross-sectional view corresponding to the VI portion of FIG. 3 and is a cross-sectional view taken along the longitudinal direction of the daughter board.

FIG. 2 is a cross-sectional view showing the connection portion between the test head and the prober in one or more embodiments, and FIG. 3 is a cross-sectional view showing the internal structure of the test head in one or more embodiments. FIG. 4A and FIG. 4B are a plan view and a bottom view showing the mother board in one or more embodiments, FIG. 5A and FIG. 5B are cross-sectional views showing the connectors mounted on the mother board and the daughter board in one or more embodiments, and FIG. 6 is an enlarged cross-sectional view corresponding to the VI portion of FIG. 3.

As shown in FIG. 2 and FIG. 3, the test head 30 includes a mother board 40 and a plurality of (ten (10) in one or more embodiments) daughter boards 50 in order to exchange test signals with the DUT of the semiconductor wafer 200. The mother board 40 is fixed to the frame 31 of the test head 30 with bolts (not shown) or the like. The plurality of daughter boards 50 are connected to the mother board 40 via the connectors 41 and 51.

The mother board 40 in one or more embodiments corresponds to an example of the "first wiring board" in one or more embodiments, and the connector 41 in one or more embodiments corresponds to an example of the "first connector" in one or more embodiments. The daughter board 50 in one or more embodiments corresponds to an example of the "second wiring board" in one or more embodiments, and the connector 51 in one or more embodiments corresponds to an example of the "second connector" in one or more embodiments.

The mother board 40 is a printed wiring board having a substrate made of, for example, glass epoxy resin. The mother board 40 is disposed below the test head 30 in a posture in which the upper and lower main surfaces 401 and 402 extend along the horizontal direction (the XY directions in the figure).

The X direction of the figure in one or more embodiments corresponds to an example of the "first direction" in one or more embodiments, and the Y direction of the figure in one or more embodiments corresponds to an example of the "second direction" in one or more embodiments.

A plurality of connectors 41 are mounted in a matrix on the upper surface 401 of the mother board 40. Specifically, as shown in FIG. 4A, in one or more embodiments, three-hundred and twenty (320) connectors 41 are arranged in sixteen (16) rows and twenty (20) columns on the upper surface 401 of the mother board 40 so as to correspond to the connectors 51 of the daughter board 50.

As shown in FIG. 5A and FIG. 5B, each connector 41 is a receptacle-type connector that includes a female terminal 411 and a housing 412 holding the female terminal 411. Further, the connector 41 is a straight-type connector in which the fitting direction (insertion and removal direction) with the counterpart connector 51 is a direction (Z direction in the drawing) substantially parallel to the normal direction (Z direction in the drawing) of the mounting surface 401 of the mother board 40.

On the other hand, as shown in FIG. 4B, a large number of pads are formed in the pad forming regions 42 of the lower surface 402 of the mother board 40. The pads are disposed to correspond to the contacts 851 of the interposer 85 (described below) that electrically connects the mother board 40 and the probe card 80. Although not particularly illustrated, other pads such as a ground may be formed in a region other than the pad forming region 42 on the lower surface 402 of the mother board 40. The connectors 41 mounted on the upper surface 401 of the mother board 40 and the pads formed on the lower surface 402 of the mother board 40 are electrically connected to each other via a conductive path such as a wiring pattern and a through-hole formed in the mother board 40.

Each daughter board 50 is a printed wiring board having a substrate made of, for example, glass epoxy resin. As shown in FIG. 2 and FIG. 3, the daughter board 50 is disposed above the mother board 40 in the test head 30 in a posture in which the main surfaces 501 and 502 extend along the vertical direction (Z direction in the drawing). The plurality of daughter boards 50 are disposed at substantially equal intervals along the X direction in the drawing and are disposed in parallel to each other.

A plurality of connectors 51 are mounted on both surfaces 501 and 502 of the daughter board 50. Specifically, sixteen (16) connectors 51 are mounted on one main surface 501 of the daughter board 50 at substantially equal intervals along an edge 503 of the daughter board 50 on the lower side (the side facing the mother board 40). Similarly, sixteen (16) connectors 51 are mounted on the other main surface 502 of the daughter board 50 at substantially equal intervals along the lower edge 503 of the daughter board 50.

As shown in FIG. 5A and FIG. 5B, each connector 51 is a plug-type connector that includes a male terminal 511 and a housing 512 holding the male terminal 511. Further, the connector 51 is a right-angle type connector in which the fitting direction (insertion and removal direction) with the counterpart connector 41 is a direction (Z direction in the drawing) substantially perpendicular to the normal direction (X direction in the drawing) of the mounting surface 501 and 502 of the daughter board 50. For convenience, only the connector 51 mounted on one main surface 501 of the daughter board 50 is illustrated in FIG. 5A and FIG. 5B, and the connector 51 mounted on the other main surface 502 of the daughter board 50 is omitted.

The connector 51 mounted on the daughter board 50 may be a connector having a female terminal. In this case, the connector 41 mounted on the mother board 40 is a connector having a male terminal.

The mother board 40 and the plurality of daughter boards 50 are electrically connected by fitting the connectors 41 and 51 together. Specifically, the male terminal 411 of one connector 41 is inserted into the female terminal 511 of the other connector 51, and the terminals 411 and 511 are brought into contact with each other, thereby the connectors 41 and 51 are electrically connected to each other. As long as the terminals 411 and 511 are in contact with each other within the effective fitting length ML (see FIG. 5B), the electrical connection between the connectors 41 and 51 is maintained. Although the connectors 41 and 51 of one or more embodiments are LIF (Low Insertion Force) connectors, they are not particularly limited this, and ZIF (Zero Insertion Force) connectors may be used as the connectors 41 and 51.

The number of daughter boards 50 connected to the mother board 40 is not particularly limited to the above as long as it is multiple, and it can be arbitrarily set. Further, the number of connectors 51 included in the daughter board 50 is not particularly limited to the above, and it can be arbitrarily set. The connector 51 may be mounted only on one of the main surfaces 501 or 502 of the daughter board 50. Further, the number and arrangement of the connectors 41 mounted on the mother board 40 are not particularly limited to the above, and they are set according to the number and arrangement of the connectors 51 included in the daughter board 50.

As shown in FIG. 2, the probe card 80 includes a plurality of probes 81 electrically contacting pads of the DUT formed on the semiconductor wafer 200, and a wiring board 82 on which the probes 81 are mounted.

The probe 81 is a probe needle made from a semiconductor substrate such as a silicon substrate by using MEMS (Micro Electro Mechanical Systems) technique. Each probe 81 is mounted on the lower surface of the wiring board 82 so that the end of the probe 81 faces the pad of the semiconductor wafer 200.

The wiring board 82 is a printed wiring board including a substrate made of, for example, a material having a relatively small coefficient of thermal expansion such as ceramics. Although not particularly illustrated, a wiring pattern is formed on the lower surface of the wiring board 82, and the probes 81 are mounted on the wiring board 82 by connecting to the wiring pattern by soldering or the like. On the other hand, a large number of pads are formed on the upper surface of the wiring board 82 so as to correspond to the contactors 851 of the interposer 85. The pad formed on the upper surface of the wiring board 82 and the wiring pattern formed on the lower surface of the wiring board 82 are electrically connected to each other via a conductive path such as a wiring pattern and a through-hole formed in the wiring board 82.

The configuration of the probe card 80 described above is merely an example, and the configuration of the probe card is not particularly limited to the above as long as it is a structure having a probe (a contactor that contacts the pad of the DUT formed on the semiconductor wafer). For example, the probe card may include a wiring board or a relay member other than the wiring board 82. Also, the configuration of the probe is not particularly limited to the above. For example, a vertical type such as a pogo pin or a membrane type in which bumps are formed in an insulating film may be used as the probe 81.

The interposer 85 includes a large number of conductive contactors 851 and a holding body 852 holding the contactors 851 and having an insulating property. Each contactor 851 is a pin having a centrally bent shape. Due to the elastic force of the contactor 851, the upper end of the contactor 851 contacts the pad on the lower surface 402 of the mother board 40, and the lower end of the contactor 851 contacts the pad on the upper surface of the wiring board 82 of the probe card 80. The pads of the mother board 40 and the pads of the wiring board 82 are electrically connected to each other via the contactors 851.

The configuration of the interposer is not particularly limited to the above as long as it has a function of electrically relaying between the mother board 40 and the probe card 80. For example, the interposer 85 may include a so-called pogo pins instead of the contactors 851 described above. Alternatively, an anisotropic conductive rubber sheet that electrically conducts in the vertical direction at the application portion when pressure is applied in the thickness direction may be used as the interposer 85. The interposer 85 may be divided into multiple.

Further, as long as the probe card 80 and the mother board 40 are electrically connected, other components such as a wiring board may be interposed between the mother board 40 and the probe card 80 in addition to the interposer 85 or in place of the interposer 85. Alternatively, the probe card 80 may be directly connected to the mother board 40 without using the interposer 85.

The probe card 80 is held by the annular holder 92 in a posture in which the probe 81 faces downward. The holder 92 is held by an annular adapter 93, and the adapter 93 is held by an opening 911 of the top plate 91 of the prober 90. The adaptor 93 is for adapting probe cards 80 of different sizes to the openings 911 of the prober 90. The probe card 80 and the mother board 40 are mechanically coupled to each other by engaging a hook 43 provided on a bottom of the mother board 40 and a hook 931 provided on the adapter 93. The interposer 85 is interposed between the probe card 80 and the mother board 40, and the probe card 80 and the mother board 40 are electrically connected via the interposer 85.

The prober 90 has a transfer arm 95 capable of moving the semiconductor wafer 200 sucked and held by the suction stage 94 in XYZ direction and rotating it by θ around the Z-axis. For the test, the transfer arm 95 makes the semiconductor wafer 200 to face the probe card 80 facing the inside of the prober 90 through the opening 911, presses the semiconductor wafer 200 against the probe card 80, and brings the probes 81 into contact with the pads of the plurality of DUTs formed on the semiconductor wafer 200. In this state, the tester 20 inputs a test signal to the DUT and receives a response signal from the DUT via the test head 30, and the tester 20 compares the response signal with a predetermined expected value to evaluate the electrical properties of the DUT.

Furthermore, as shown in FIG. 2 and FIG. 3, the test head 30 of one or more embodiments includes a plurality of adjusting mechanisms 60.

Here, a downward deflection may occur in the mother board 40 to which the plurality of daughter boards 50 are connected via the connectors 41 and 51 due to the pressure of the daughter boards 50. In one or more embodiments, since the position of the daughter board 50 in the height direction is changed by the adjusting mechanism 60 in a state in which the connectors 41 and 51 are fitted to each other, it is possible to correct deformation such as deflection occurring in the mother board 40.

One adjusting mechanism 60 is assigned to one daughter board 50. Therefore, the test head 30 of one or more embodiments includes ten (10) adjusting mechanisms 60. As shown in FIG. 3 and FIG. 6, each adjusting mechanism 60 includes a holding member 61, a pair of fixed members 63, and a pair of adjusting screws 64.

The holding member 61 is a flat bar-shaped member that is bridged over the frame 31 of the test head 30 so as to face the upper surface 401 of the mother board 40 via the daughter board 50. Although not particularly limited, the holding member 61 has a flat rectangular cross-sectional shape. For example, the holding member 61 may have a substantially U-shaped cross-sectional shape having ribs standing on both sides.

The holding member 61 extends substantially parallel to the daughter board 50 and is disposed along the upper edge 504 of the daughter board 50. Therefore, the daughter board 50 is interposed between the mother board 40 and the holding member 61 in the vertical direction.

Fixing holes 611 that penetrate the holding member 61 in the vertical direction are formed at both ends of the holding member 61. The holding member 61 is fixed to the frame 31 by a fixing screw 62 inserted through the fixing hole 611.

As long as the holding member 61 is fixed relatively (directly or indirectly) to the frame 31, other member may be interposed between the holding member 61 and the frame 31. Further, although the frame 31 of the test head 30 is used as a supporting body for fixing the holding member 61 in one or more embodiments, instead of the frame 31, another member to which the mother board 40 is fixed relatively (directly or indirectly) may be used as a support body.

Further, holding holes 612 each of which penetrates the holding member 61 in the vertical direction are formed in the holding member 61. The holding holes 612 are respectively formed at positions corresponding to the fixed members 63 fixed to the daughter boards 50.

Each of the fixed members 63 is a member fixed to the daughter board 50 using a rivet or the like. The fixed members 63 are disposed in the vicinity of the left and right ends (both ends in the Y direction in the drawing) of the upper edge 504 on one main surface 501 of the daughter board 50. A fixed hole 631 opened at an upper portion is formed along a vertical direction (Z direction in the drawing) in each of the fixed members 63, and a female thread portion 632 is formed on an inner peripheral surface of the fixed hole 631.

The adjusting screw 64 is a so-called hexagon socket head bolt (cap bolt). The adjusting screw 64 is inserted into the holding hole 612 of the holding member 61 and is screwed with the fixed member 63.

Specifically, each adjusting screw 64 includes a head part 641 and a shaft part 643. The head part 641 of the adjusting screw 64 has an outer diameter larger than the inner diameter of the holding hole 612 of the holding member 61. On the other hand, the shaft part 643 of the adjusting screw 64 has an outer diameter smaller than the inner diameter of the holding hole 612. Therefore, while the shaft part 643 of the adjusting screw 64 is inserted into the holding hole 612 of the holding member 61, the seating surface 642 of the head part 641 of the adjusting screw 64 contacts the holding member 61, and the adjusting screw 64 is held by the holding member 61. The male thread portion 644 of the shaft part 643 of the adjusting screw 64 is inserted into the fixed hole 631 of the fixed member 63 and screwed with the female thread portion 632.

When the adjusting screw 64 is rotated in the tightening direction (clockwise), the fixed member 63 approaches the holding member 61 holding the adjusting screw 64, and the daughter board 50 is relatively raised with respect to the holding member 61. At this time, since the connector 41 of the mother board 40 and the connector 51 of the daughter board 50 are fitted to each other, the mother board 40 is also pulled up through the daughter board 50 by the rotation of the adjusting screw 64. As a result, it possible to correct deformation such as deflection occurring in the mother board 40.

Further, in one or more embodiments, although the fitting of the connectors 41 and 51 is maintained during the rotation of the adjusting screw 64, the pull-up force of the daughter board 50 by the rotation of the adjusting screw 64 is set to exceed the pull-out force of the connectors 41 and 51 (the force required to pull out the connector 41 from the connector 51). Therefore, the connector 51 of the daughter board 50 can be raised relative to the connector 41 of the mother board 40 while also pulling up the mother board 40 via the daughter board 50 by the rotation of the adjusting screw 64. As a result, since the weight of the daughter board 50 can be released to the frame 31 via the holding member 61, it is possible to further improve the flatness of the motherboard 40. At this time, in order to ensure the electric connection of the connectors 41 and 51, it is preferable that the rising amount of the daughter board 50 due to the rotation of the adjusting screw 64 is smaller than the effective fitting length ML of the connectors 41 and 51.

The pull-out force of the connectors 41 and 51 may be greater than the pull-up force of the daughter board 50 by the rotation of the adjusting screw 64.

Figure 7:
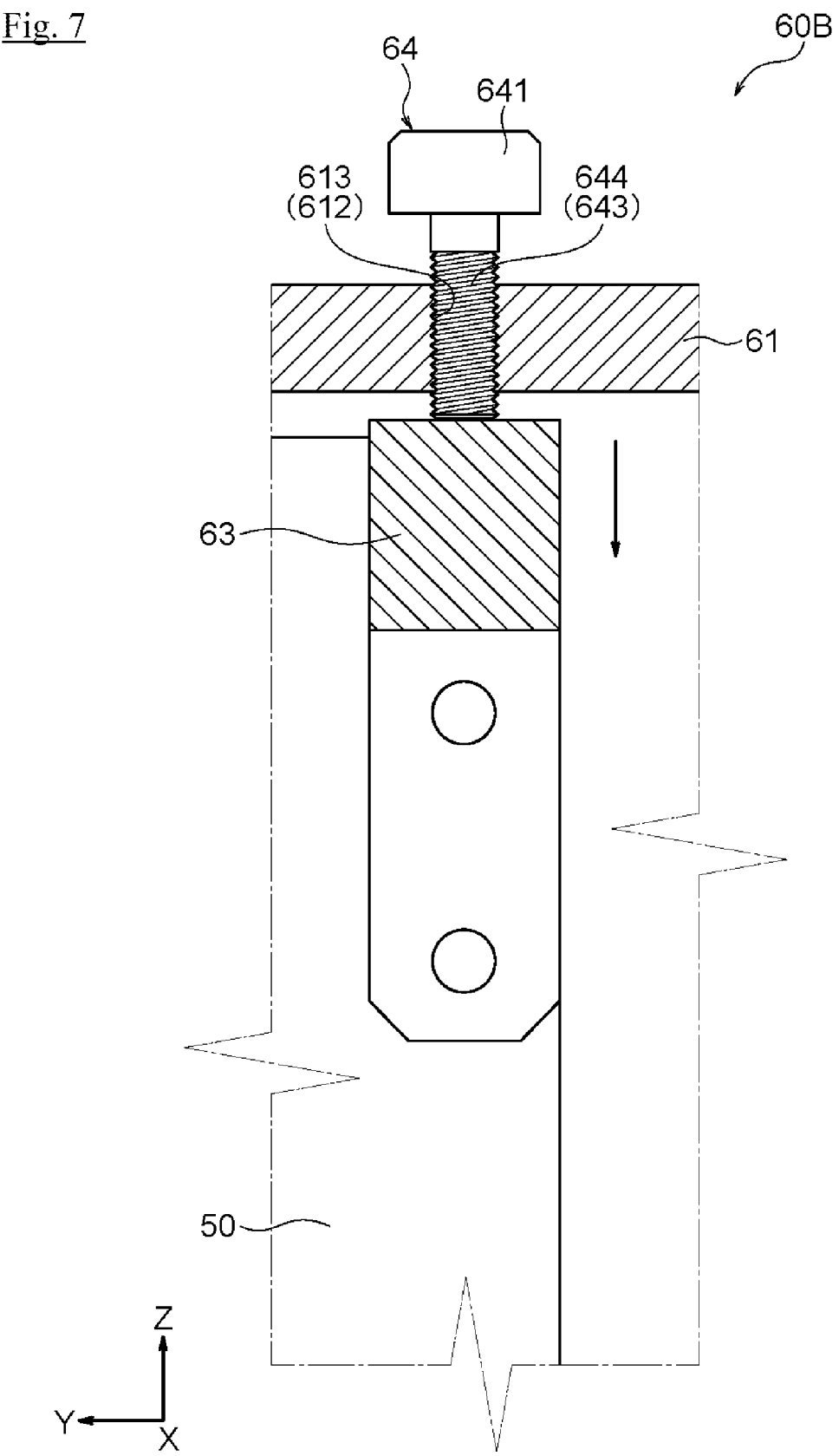
FIG. 7 is a cross-sectional view showing the first modification of the adjusting mechanism in the first example.
Figure 8:
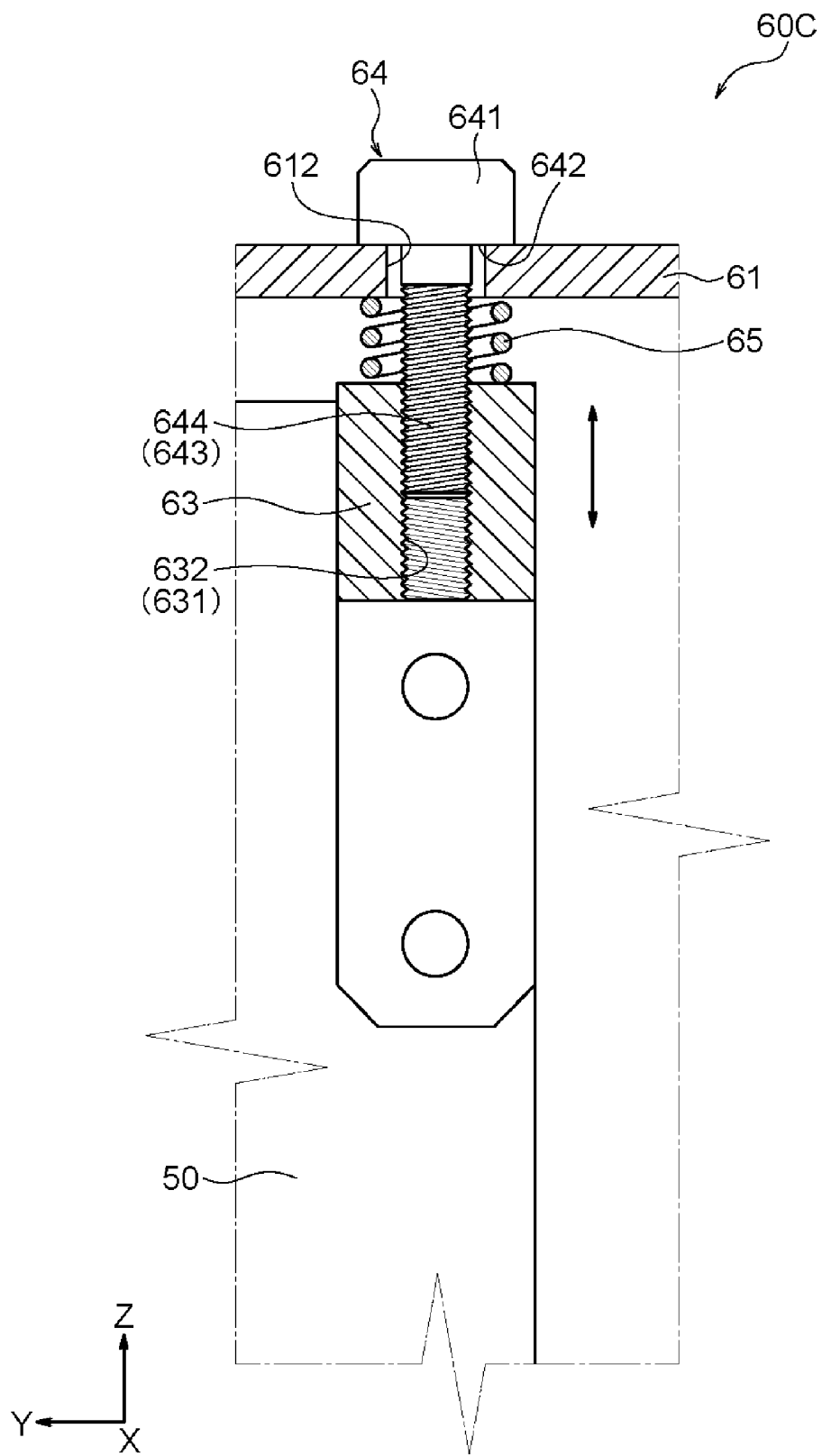
FIG. 8 is a cross-sectional view showing the second modification of the adjusting mechanism in the first example.

The configuration of the adjusting mechanism 60 described above is not particularly limited to the above as long as it is a mechanism capable of raising and/or lowering the daughter board 50. Although not particularly limited, for example, the adjusting mechanism may have a configuration as shown in FIG. 7 or FIG. 8. FIG. 7 is a cross-sectional view showing the first modification of the adjusting mechanism in one or more embodiments, and FIG. 8 is a cross-sectional view showing the second modification of the adjusting mechanism in one or more embodiments.

While the adjusting mechanism 60 described above has only the function of raising the daughter board 50, the adjusting mechanism 60B shown in FIG. 7 only has the function of lowering the daughter board 50.

In the adjusting mechanism 60B, the female screw portion is not formed in the fixed member 63, the female screw portion 613 is formed on the inner peripheral surface of the holding hole 612 of the holding member 61, and the front end of the adjusting screw 64 abuts against the fixed member 63. In this first modification, when the adjusting screw 64 is rotated in the tightening direction (clockwise), the front end of the adjusting screw 64 pushes down the daughter board 50 via the fixed member 63. When an upward deformation such as warp occurs in the mother board 40, it is possible to correct the deformation by the adjusting mechanism 60B.

The adjusting mechanism 60C shown in FIG. 8 has both functions of raising and lowering the daughter board 50. Specifically, the adjusting mechanism 60C includes a coil spring 65 interposed between the holding member 61 and the fixed member 63. Instead of the coil spring 65, other elastic members such as a spring washer, a wave washer, and a conical spring washer may be interposed between the holding member 61 and the fixed member 63.

In this second modification, when the adjusting screw 64 is rotated in the tightening direction (clockwise), the fixed member 63 is raised against the elastic force of the coil spring 65, and the daughter board 50 is pulled up. On the other hand, when the adjusting screw 64 is rotated in the loosening direction (counterclockwise direction), the fixed member 63 is lowered and the daughter board 50 is pushed down by the elastic force of the coil spring 65 while the state where the head part 641 of the adjusting screw 64 contacts the holding member 61 is maintained. The adjusting mechanism 60C can cope with both of a case where a downward deformation such as deflection occurs in the mother board 40 due to the pressure of the daughter board 50 and a case where an upward deformation such as warp occurs in the mother board 40.

Although not particularly illustrated, the arrangement of the male thread portion and the female thread portion in the adjusting mechanism 60 may be opposite to the arrangement described above. In this case, the adjusting mechanism 60 includes an adjusting nut instead of the adjusting screw 64, the shaft having the male thread portion protrudes upward from the fixed member 63 and is inserted into the holding hole 612 of the holding member 61, and the adjusting nut is screwed with the shaft.

Figure 9:
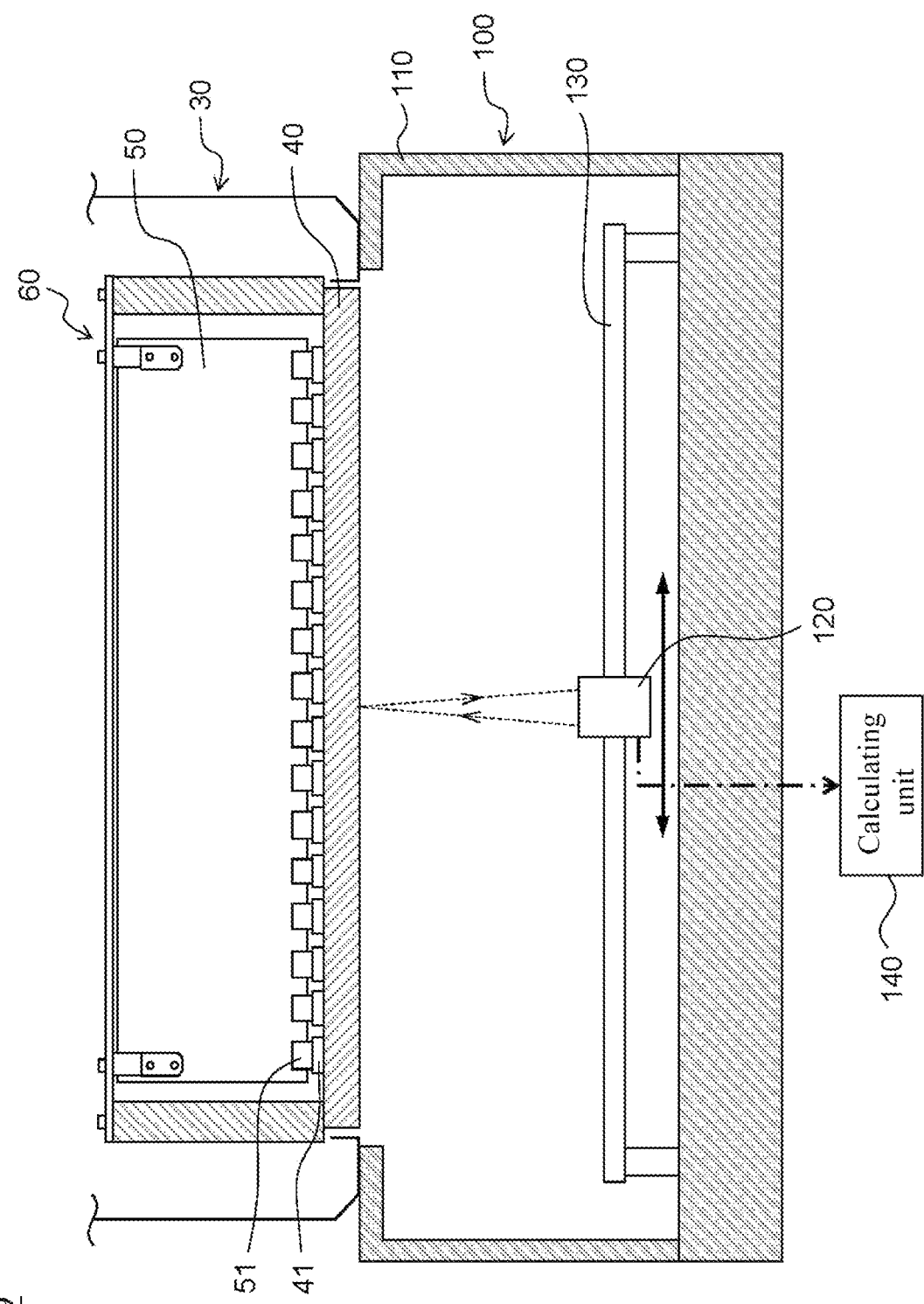
FIG. 9 is a cross-sectional view showing the flatness measuring device in the first example.

FIG. 9 is a cross-sectional view showing the flatness measuring device in one or more embodiments.

The semiconductor wafer testing system 1 of one or more embodiments includes a flatness measuring device 100 independent of the semiconductor wafer testing apparatus 10 and the prober 90. The flatness measuring device 100 is a device that measures the flatness of the mother board 40 in a state where the mother board 40 is mounted on the test head 30. The flatness measuring device 100 is not included in the semiconductor wafer testing system 1, and for example, the flatness measuring device 100 may be installed alone in a factory.

Here, as described above, in a state in which the mother board 40 is mounted on the test head 30, since the plurality of daughter boards 50 are already connected to the mother board 40 via the connectors 41 and 51, and a downward deflection of the mother board 40 may occur due to the pressure of the daughter board 50. Therefore, in one or more embodiments, before the test head 30 is coupled to the prober 90, the flatness of the mother board 40 mounted on the test head 30 is measured by the flatness measuring device 100, and the mother board 40 is flattened by using the above-described adjusting mechanisms 60. Although not particularly limited, as the specific timing of the flattening (planarization) of the mother board 40, the shipping of the test head 30, the exchange of the mother board 40, and the like are exemplified.

The flatness of the mother board 40 is the magnitude of the deviation of the lower surface 402 of the mother board 40 from the geometrically correct reference plane. Specifically, the flatness in one or more embodiments is expressed by a set of differences in the Z-direction of the lower surface 402 of the mother board 40 with respect to an approximate plane (reference plane) at the specific points $SP_1$ to $SP_{17}$, as will be described later.

As shown in FIG. 9, the flatness measuring device 100 includes a frame 110, a measuring unit (example of a measuring instrument) 120, a moving device 130, and a calculating unit 140.

The frame 110 can hold the test head 30 in a posture in which the lower surface 402 of the mother board 40 faces downward. The measuring unit 120 and the moving device 130 are disposed in the frame 110.

The measuring unit 120 is, for example, a laser displacement meter that irradiates the specific points $SP_1$ to $SP_{17}$ of the lower surface 402 of the mother board 40 with laser light and acquires coordinate values of the specific points $SP_1$ to $SP_{17}$ in the Z-direction by the reflected light. The measuring unit 120 is not limited to the laser displacement meter as long as it can measure the height-direction coordinates of the specific points $SP_1$ to $SP_{17}$ on the lower surface 402 of the mother board 40.

The moving device 130 is a device that moves the measuring unit 120 in the XY directions, and includes, for example, a linear guide, a ball screw mechanism, a motor, and the like. The measuring unit 120 is moved by the moving device 130 to a position facing the specific points $SP_1$ to $SP_{17}$ of the mother board 40 in the XY directions. The moving device 130 is not particularly limited to the above as long as it can move the measuring unit 120 in the XY directions, for example, a robotic arm may be used as the moving device 130.

The calculating unit 140 is configured by, for example, a computer. The calculating unit 140 calculates the flatness of the lower surface 402 of the mother board 40 based on the measurement result of the measuring unit 120. A specific calculating method of the flatness by the calculating unit 140 will be described later.

Figure 10:
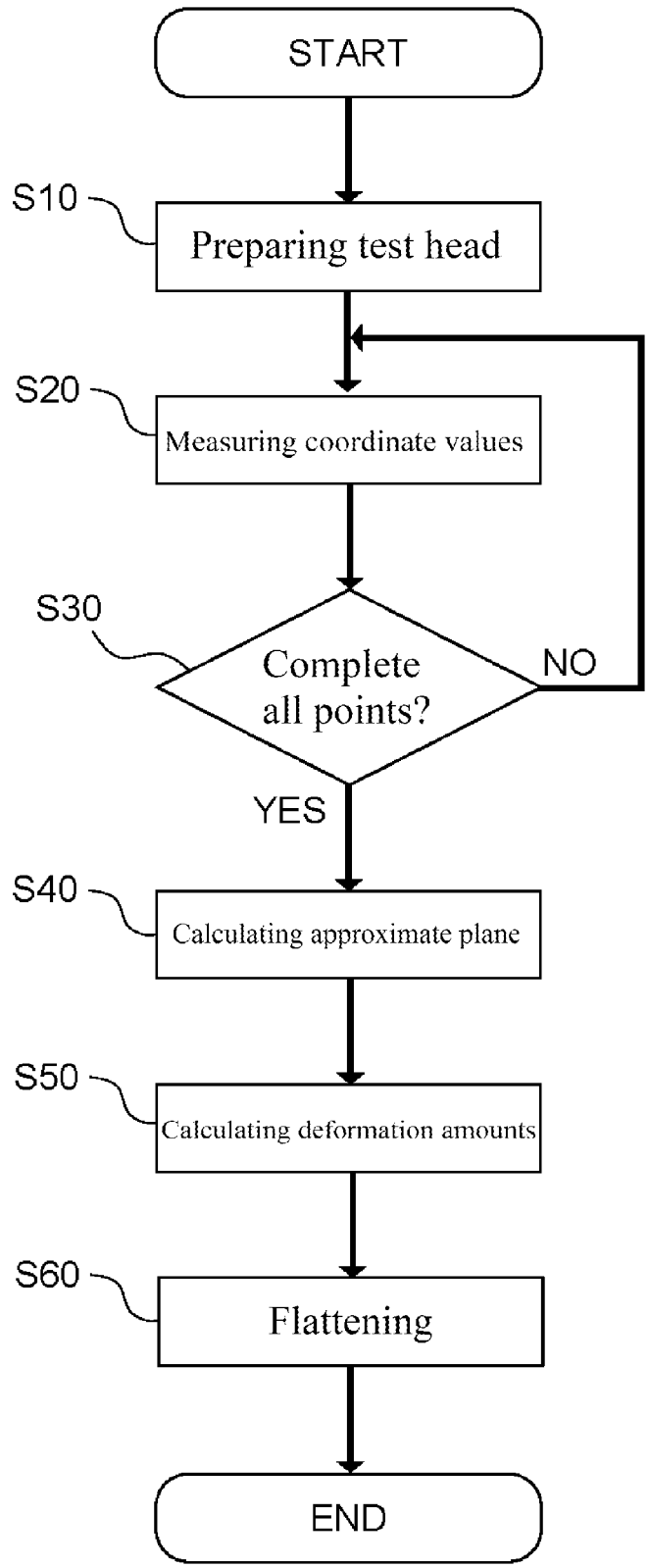
FIG. 10 is a flowchart showing the method of adjusting the flatness in the first example.

The method of adjusting the flatness of the mother board in one or more embodiments will be described with reference to FIG. 10. FIG. 10 is a flowchart showing the method of adjusting the flatness in one or more embodiments. The flatness calculating method described below is merely an example, and the flatness calculating method is not particularly limited to this. For example, the method described in the third example, which will be described later, may be used, or the flatness may be calculated by another method.

First, in step S10 of FIG. 10, the test head 30 on which the mother board 40 is mounted is prepared. Specifically, in this test head 30, the mother board 40 is fixed to the frame 31 of the test head 30, and the connectors 51 of the daughter boards 50 are fitted to the connectors 41 of the mother board 40.

Next, in step S20 of FIG. 10, the coordinate values in the Z direction of the seventeen (17) specific points $SP_1$ to $SP_{17}$ on the lower surface 402 of the mother board 40 are measured. In one or more embodiments, since the pads are present at the specific points $SP_1$ to $SP_{17}$, strictly speaking, the coordinate values of the specific points $SP_1$ to $SP_{17}$ in the Z direction are the coordinate values of the surface of the pads in the Z direction.

Specifically, first, the test head 30 prepared in step S10 described above is supported by the frame 110 of the flatness measuring device 100. Next, the moving device 130 moves the measuring unit 120 to a position facing the specific point $SP_1$, and the measuring unit 120 acquires the Z coordinate value of this specific point $SP_1$. Next, the moving device 130 sequentially moves the measuring unit 120 to positions facing the next specific points $SP_2$ to $SP_{17}$, and the measuring unit 120 sequentially acquires the Z coordinate values of the specific points $SP_2$ to $SP_{17}$. The Z coordinate values of the specific points $SP_1$ to $SP_{17}$ are sequentially output from the measurement unit 120 to the calculating unit 140.

The positions of the specific points on the lower surface 402 of the mother board 40 are not limited to the above specific points $SP_1$ to $SP_{17}$. Also, the number of specific points on the lower surface 402 of the mother board 40 is not particularly limited to the above. For example, a position corresponding to the connector 41 on the lower surface 402 of the mother board 40 may be the specific point measured by the measuring unit 120.

When the Z coordinate values of all the specific points $SP_1$ to $SP_{17}$ have been measured (YES in step S30), the calculating unit 140 creates an approximate plane from the XYZ coordinate values of the specific points $SP_1$ to $SP_{17}$ in the step S40 of FIG. 10, and the calculating unit 140 calculates the deformation amounts in the Z direction at the specific points $SP_1$ to $SP_{17}$ in the step S50 of FIG. 10. The X coordinate values and Y coordinate values of the specific points $SP_1$ to $SP_{17}$ are preset known coordinate values.

Specifically, first, the calculating unit 140 calculates an approximate plane passing through the specific points $SP_1$ to $SP_{17}$ using the least-squares method or the like (step S40). Next, the calculating unit 140 extracts the coordinate values in the Z direction at the positions corresponding to the specific points $SP_1$ to $SP_{17}$ in the approximate plane. Next, the calculating unit 140 calculates, as the flatness, the differences (deformation amounts) between the actual Z coordinate value of the lower surface 402 of the mother board 40 and the Z coordinate value on the approximate plane for all the specific points $SP_1$ to $SP_{17}$ (step S50).

Next, in step S60 of FIG. 10, the adjusting mechanisms 60 flatten the mother board 40 based on the deformation amounts.

Specifically, the operator pulls up the daughter board 50 by rotating the adjusting screw 64 of the adjusting mechanism 60 in the tightening direction (clockwise). At this time, a shim 66 (a member indicated by a broken line in FIG. 6) is interposed between the holding member 61 and the fixed member 63, and the operator rotates the adjusting screw 64 until the fixed member 63 abuts against the shim 66. As a result, the distance between the holding member 61 and the fixed member 63 is narrowed, the daughter board 50 is pulled up with respect to the holding member 61, and the above-described deformation amounts at the specific points $SP_1$ to $SP_{17}$ are eliminated (cancelled). The shim 66 is selected to have a thickness such that the pull-up amount is an amount that eliminates the deformation amount, and the shim 66 is individually selected for each of the adjusting mechanisms 60 in accordance with the deformation amounts at the specific points $SP_1$ to $SP_{17}$.

A table showing the correspondence relationship between the deformation amounts at the specific points $SP_1$ to $SP_{17}$ and the pull-up amount of the daughter board 50 (thickness of the shim 66) by each adjusting mechanism 60 required to eliminate the deformation amounts may be prepared in advance by experiment or the like.

Alternatively, a table showing the correspondence between the deformation amounts at the specific points $SP_1$ to $SP_{17}$ and the rotation amount of the adjusting screw 64 of each adjusting mechanism 60 required to eliminate the deformation amount may be prepared in advance, and the adjusting mechanism 60 may be operated without using the shim 66.

Alternatively, the operator may operate the adjusting mechanism 60 while measuring the deformation amount at the specific points $SP_1$ to $SP_{17}$ with the flatness measuring device 100, and the operator may continue to turn the adjusting screw 64 until the deformation amount at the specific points $SP_1$ to $SP_{17}$ becomes substantially zero.

When the pull-up amount of the adjusting mechanism 60 is insufficient, another shim may be interposed between the holding member 61 and the frame 31 to increase the distance between the holding member 61 and the fixed member 63.

As described above, in one or more embodiments, the test head 30 includes the plurality of adjusting mechanisms 60 that change the position of the daughter board 50 along the height direction in a state where the connectors 41 and 51 are fitted to each other, and the mother board 40 can be flattened by using the connector 41 mounted on the mother board 40. Therefore, it is possible to adjust the flatness of the mother board 40 without limiting the space on the mother board 40.

Second Example

Figure 11:
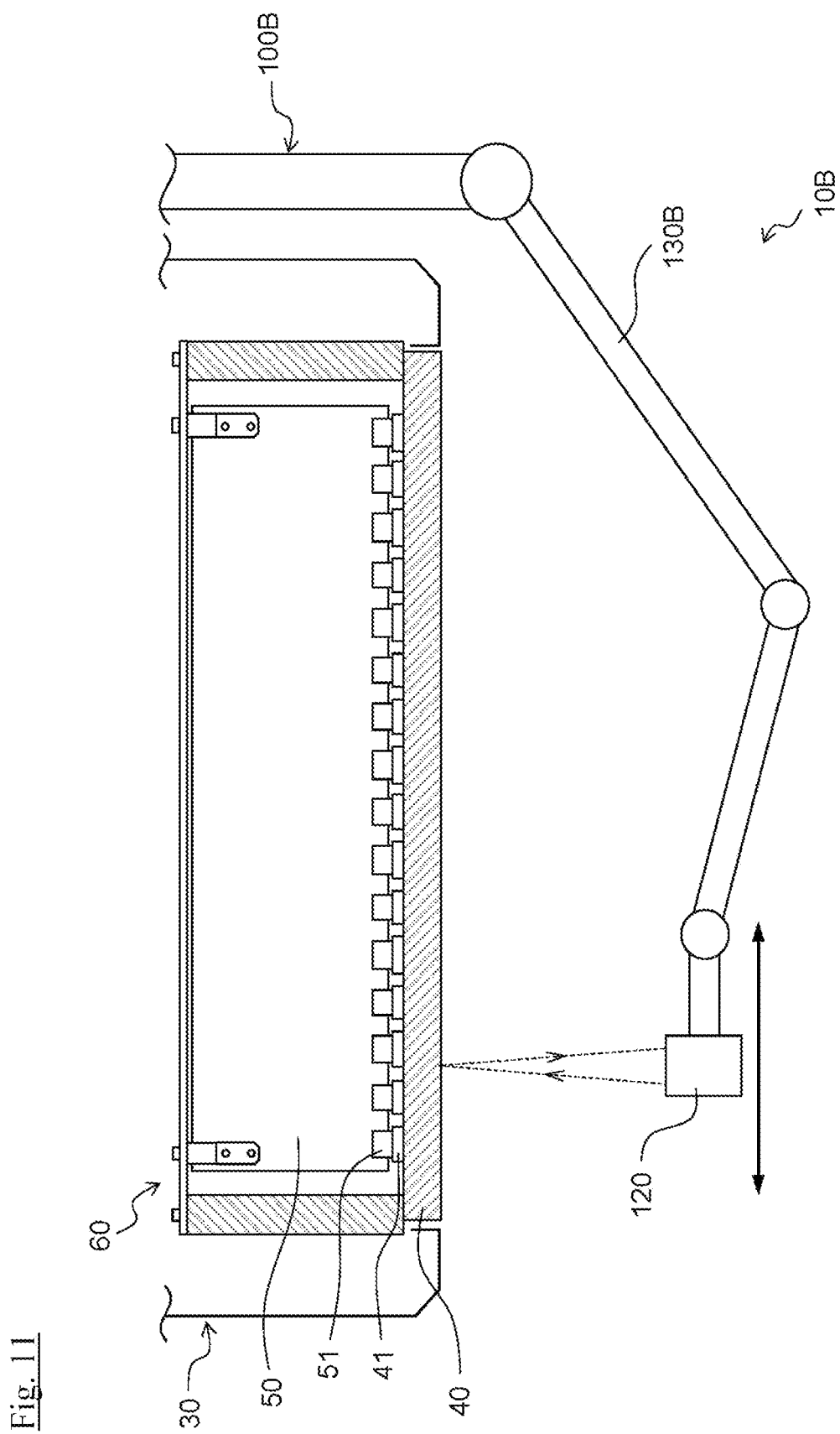
FIG. 11 is a diagram showing the flatness measuring device included in the semiconductor wafer testing apparatus in a second example of one or more embodiments.
Figure 12A:
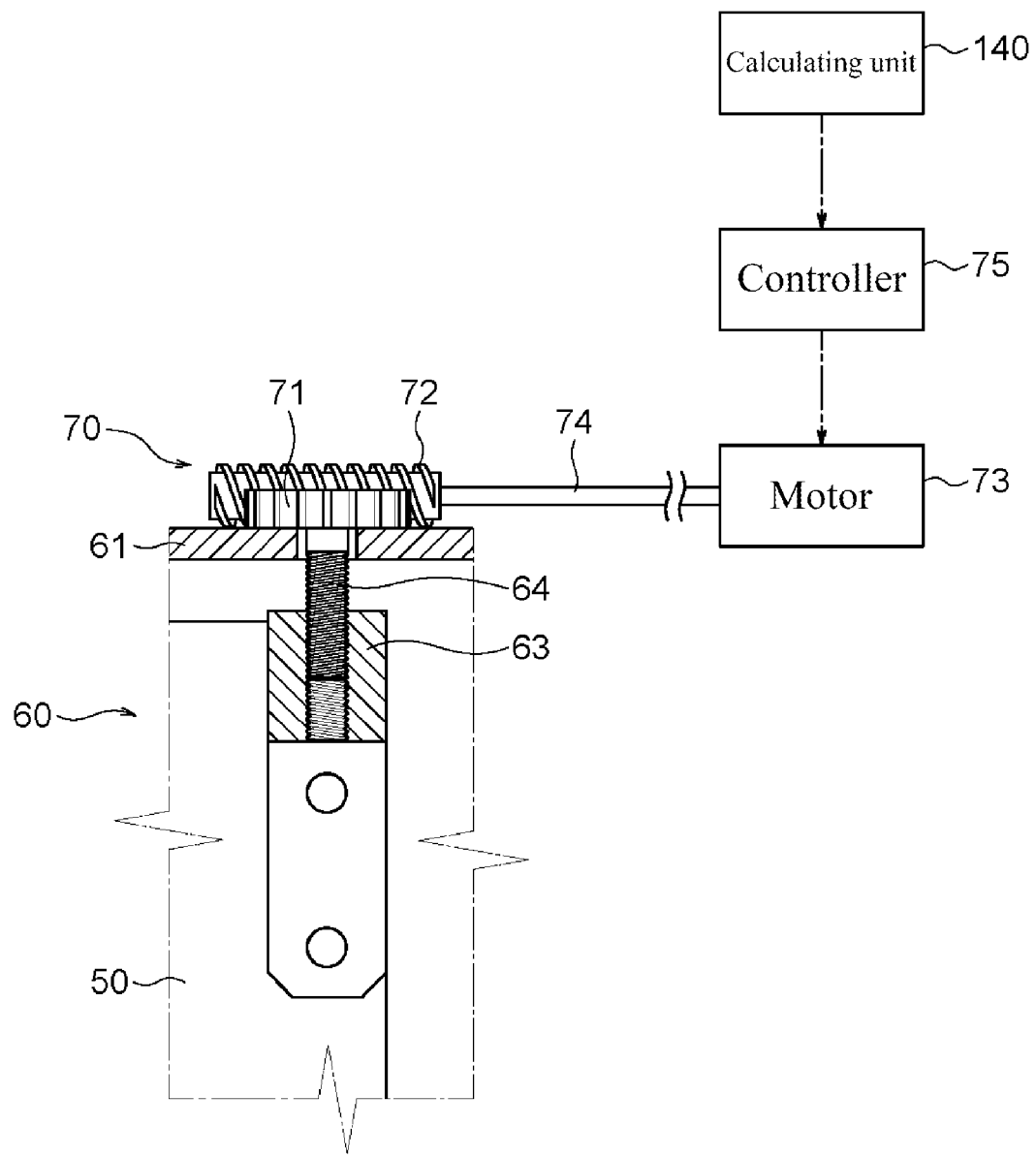
FIG. 12A is a cross-sectional view showing the adjusting mechanism of the semiconductor wafer testing system in the second example.
Figure 12B:
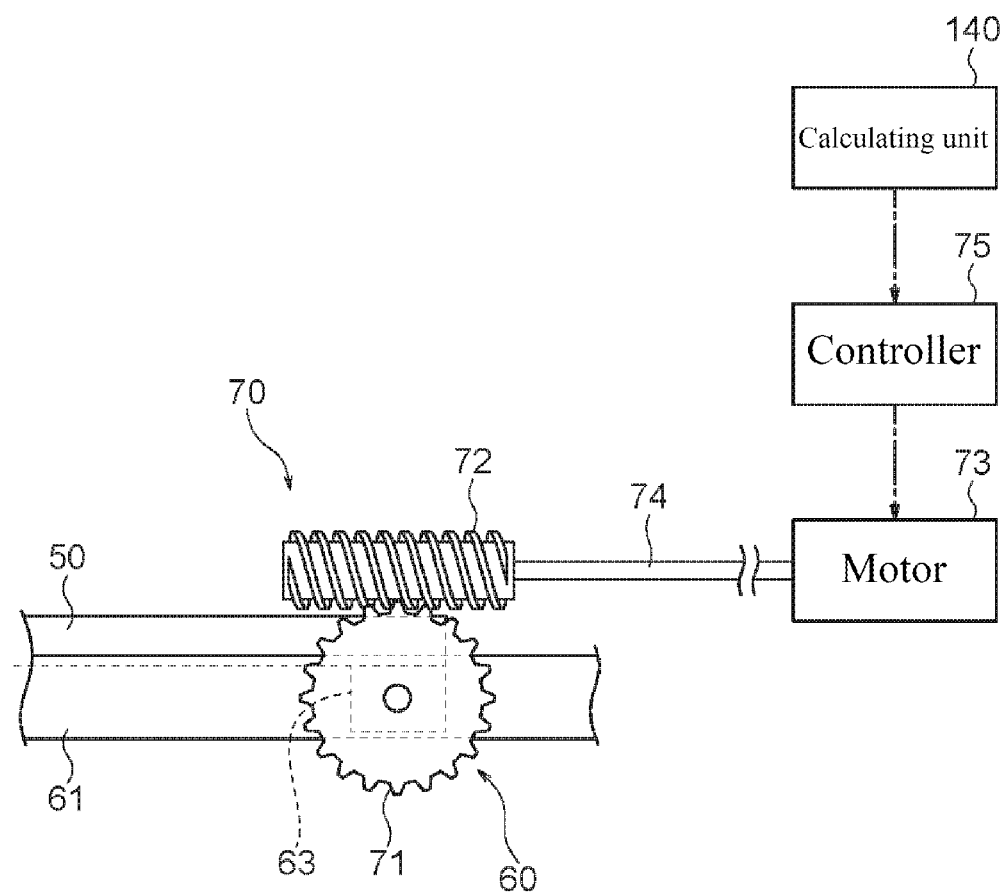
FIG. 12B is a plan view showing the adjusting mechanism of the semiconductor wafer testing system in the second example.

FIG. 11 is a diagram showing the flatness measuring device included in the semiconductor wafer testing apparatus in one or more embodiments, FIG. 12A and FIG. 12B are a cross-sectional view and a plan view showing the adjusting mechanism of the semiconductor wafer testing system in one or more embodiments.

The second example is different from the first example in that (1) the flatness measuring device 100B is incorporated in the semiconductor wafer testing device 10B and (2) the operation of the adjusting mechanisms 60 is automated, but the other configurations are the same as those of the first example. In the following, the semiconductor wafer testing system of the second example will be described only with respect to the differences from the first example, and parts having the same configuration as those of the first example will be denoted by the same reference numerals, and description thereof will be omitted.

As shown in FIG. 11, the semiconductor wafer testing apparatus 10B in one or more embodiments includes a flatness measuring device 100B in addition to the tester 20 and the test head 30. The flatness measuring device 100B includes a measuring unit 120, a robot arm 130B, and a calculating unit 140 (not shown in FIG. 11). The measuring unit 120 is attached to the front end of the robot arm 130B. The robot arm 130B is connected, for example, to the side of the test head 30 and is capable of moving the measuring unit 120 in the XYZ directions.

The robot arm 130B sequentially moves the measuring unit 120 to the positions facing the specific points $SP_1$ to $SP_{17}$. The measuring unit 120 sequentially acquires the Z coordinate values of the specific points $SP_1$ to $SP_{17}$ and sequentially outputs the Z coordinate values of the specific points $SP_1$ to $SP_{17}$ to the calculating unit 140. The calculating unit 140 calculates the deformation amount in the Z direction at each of the specific points $SP_1$ to $SP_{17}$.

The flatness measuring device 100B may include another moving device capable of moving the measuring unit 120 at least in the XY directions instead of the robot arm 130B. Further, although the flatness measuring device 100B is attached to the test head 30 in one or more embodiments, the flatness measuring device 100B may be provided in the prober 90. In this case, the prober 90 includes the flatness measuring device 100B.

Further, as shown in FIG. 12A and FIG. 12B, the semiconductor wafer testing apparatus 10B in one or more embodiments includes a driving device 70 that drives the adjusting mechanisms 60 and a controller 75 that controls the driving device 70.

The driving device 70 includes a worm wheel 71, a worm gear 72 and a motor 73. The worm wheel 71 is fixed to the head part 641 of the adjusting screw 64. The worm gear 72 is engaged with the worm wheel 71 and is connected to a drive shaft of the motor 73 via a shaft 74.

The driving device 70 may be individually provided for each adjusting mechanism 60. Alternatively, the plurality of adjusting mechanisms 60 may be driven by the single driving device 70. For example, the plurality of adjusting screws 64 disposed at one end (+Y direction side in the drawing) of daughter boards 50 may be driven by one driving device 70, and the plurality of adjusting screws 64 disposed at the other end (the −Y direction side in the figure) of the daughter board 50 may be driven by another driving device 70.

The configuration of the driving device 70 is not particularly limited to the above as long as the adjusting screw 64 is automatically operated. Also, the configuration of the adjusting mechanism and the driving device is not particularly limited to the above as long as the daughter board 50 can be automatically raised and/or lowered. For example, the adjusting mechanism and the driving device may include a ball screw mechanism and a motor coupled to the daughter board 50.

The controller 75 is configured by, for example, a computer. The controller 75 calculates, for each adjusting mechanism 60, the pull-up amount of the daughter board 50 (rotation amount of the adjusting screw 64) that eliminates the deformation amount calculated by the calculating unit 140 of the flatness measuring device 100B, and the controller 75 controls the driving device 70 so that the adjusting mechanism 60 is driven by the pull-up amount.

As described above, similarly to the first example, also in the second example, the test head 30 includes the plurality of adjusting mechanisms 60 that change the position of the daughter board 50 along the height direction in a state where the connectors 41 and 51 are fitted to each other, and the mother board 40 can be flattened by using the connector 41 mounted on the mother board 40. Therefore, it is possible to adjust the flatness of the mother board 40 without limiting the space on the mother board 40.

Although the flattening work of the mother board 40 is entirely automated in one or more embodiments, it is not particularly limited to this. The semiconductor wafer testing apparatus 10B may include the flatness measuring device 100B but may not include the driving device 70 and the control device 75, and the adjusting mechanisms 60 may be operated manually. Alternatively, the semiconductor wafer testing apparatus 10B may includes the driving apparatus 70 and the control apparatus 75 but may not include the flatness measuring apparatus 100B.

Although the semiconductor wafer testing apparatus 10B of one or more embodiments includes the adjusting mechanism 60 shown in FIG. 6, it is not particularly limited to this. The semiconductor wafer testing apparatus 10B may include the adjusting mechanism 60B shown in FIG. 7 or the adjusting mechanism 60C shown in FIG. 8 instead of the adjusting mechanism 60.

Third Example

Figure 13:
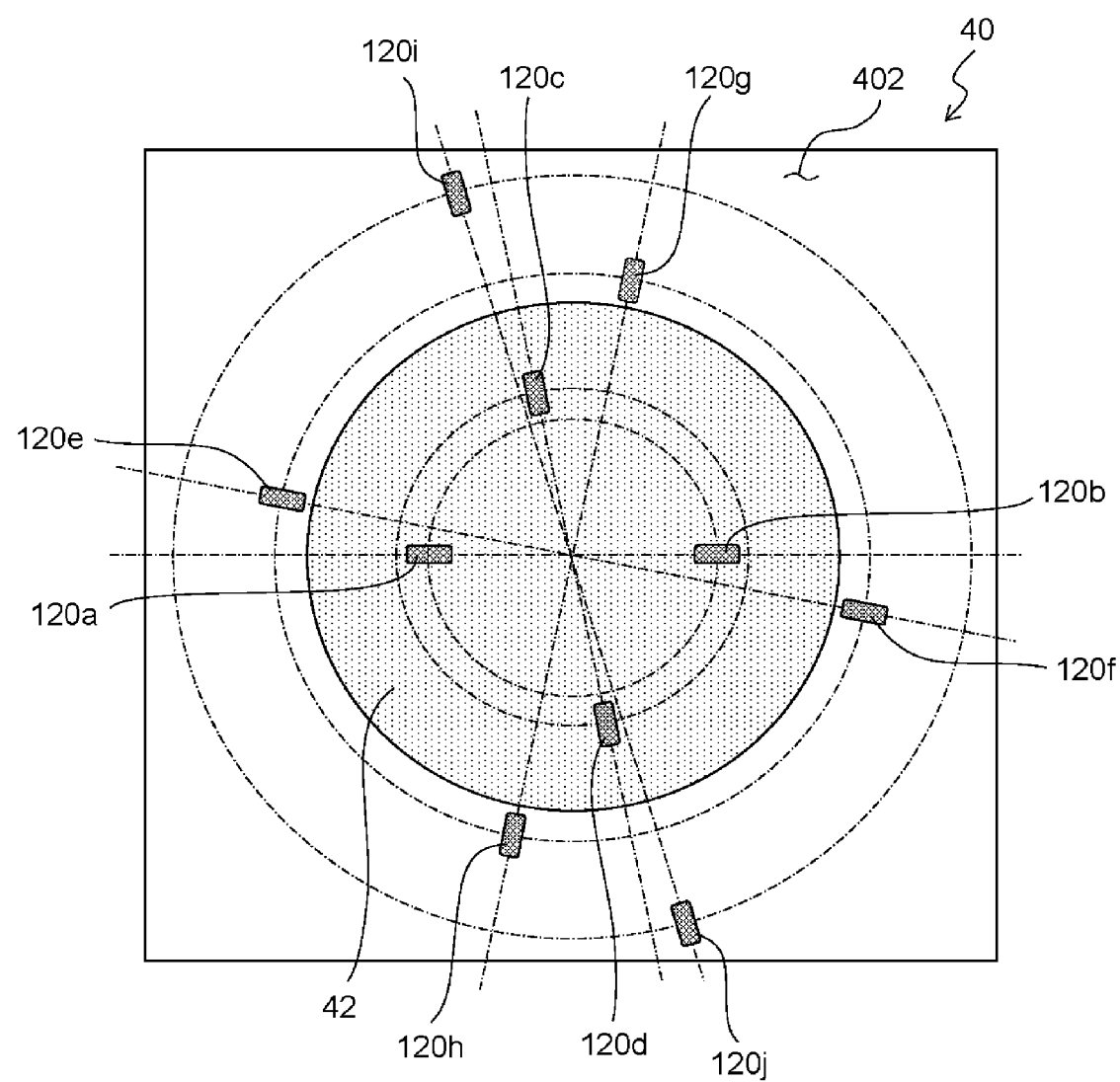
FIG. 13 is a bottom view showing the mother board in a third example of one or more embodiments.

FIG. 13 is a bottom view showing the mother board in one or more embodiments.

The third example is different from the first example in the method of calculating the flatness of the mother board 40. In the following, the semiconductor wafer testing system of the third example will be described only with respect to the differences from the first example, and parts having the same configuration as those of the first example will be denoted by the same reference numerals, and description thereof will be omitted.

In one or more embodiments, the flatness of the mother board 40 is measured using the strain gauges 120a to 120j instead of the Z direction coordinate values of the specific points $SP_1$ to $SP_{17}$ on the lower surface 402 of the mother board 40.

Specifically, as shown in FIG. 13, the strain gauges 120a to 120j are attached to specific points on the lower surface 402 of the mother board 40 mounted on the test head 30. Although not particularly limited, in one or more embodiments, the strain gauges 120a to 120j include a plurality of sets disposed point-symmetrically with respect to the center of the pad forming region 42 of the mother board 40. The resistance values of the strain gauges 120a to 120j are measured, the difference between the resistance value and the reference value is calculated, and the flatness of the lower surface 402 of the mother board 40 is calculated from the difference and the direction of each strain. The strain gauges 120a to 120j themselves may be formed on the mother board 40 in advance.

The reference values to be compared with the resistance values of the strain gauges 120a to 120j are the resistance values measured by the strain gauges 120a to 120j attached to the mother board 40 before the mother board 40 is mounted on the test head 30. Therefore, the flatness of the mother board 40 in one or more embodiments is represented by a set of differences between actual strain (measured resistance value) and strain when flat (reference resistance value) at the specific points.

The reference value is not particularly limited to the above. When the mother board 40 is sufficiently flat in a state where the mother board 40 is mounted on the test head 30, the reference value be obtained by measuring the above mother board 40 may be used as a reference value.

Then, the operator operates the adjusting mechanism 60 based on the flatness calculated using the strain gauges 120a to 120j. At this time, the shim is interposed between the holding member 61 and the fixed member 63, and the operator rotates the adjusting screw 64 until the fixed member 63 abuts against the shim.

A table showing the correspondence relationship between the difference of the resistance values of the strain gauges 120a to 120j and the pull-up amount of the daughter board 50 (thickness of the shim) by each adjusting mechanism 60 required to eliminate the difference may be prepared in advance by experiment or the like.

Alternatively, a table showing the correspondence between the difference of the resistance values of the strain gauges 120a to 120j and the rotation amount of the adjusting screw 64 of each adjusting mechanism 60 required to eliminate the difference may be prepared in advance, and the adjusting mechanism 60 may be operated without using the shim.

Alternatively, the operator may operate the adjusting mechanism 60 while measuring the resistance values of the strain gauges 120a to 120j, and the operator may continue to turn the adjusting screw 64 until the difference of the resistance values of the strain gauges 120a to 120j becomes substantially zero.

As described above, similarly to the first example, also in second example, the test head 30 includes the plurality of adjusting mechanisms 60 that change the position of the daughter board 50 along the height direction in a state where the connectors 41 and 51 are fitted to each other, and the mother board 40 can be flattened by using the connector 41 mounted on the mother board 40. Therefore, it is possible to adjust the flatness of the mother board 40 without limiting the space on the mother board 40.

The flatness calculating method described in the third example may be applied to the semiconductor wafer testing system of the second example.

It should be noted that the embodiments described above are described to facilitate understanding of the present disclosure and are not described to limit the present disclosure. It is therefore intended that the elements disclosed in the above embodiments include all design modifications and equivalents to fall within the technical scope of the present disclosure.

For example, in the above-described embodiments, although the test head 30 is held in a posture in which the main surface 402 of the mother board 40 faces downward during flattening, the posture of the test head 30 is not particularly limited to this. For example, the test head 30 may be held in a posture in which the main surface 402 of the mother board 40 faces the lateral direction during flattening.

The configuration of the semiconductor wafer testing system 1 described above is merely an example, and the configuration of the semiconductor wafer testing system is not particularly limited to this. For example, the mechanical connection structure between the test head 30 and the prober 90 described above is merely an example, and the mechanical connection structure between the test head and the prober is not particularly limited to this.

Similarly, the configuration of the semiconductor wafer testing apparatus 10 described above is merely an example, and the configuration of the semiconductor wafer testing apparatus is not particularly limited to this. For example, the function of the tester 20 may be incorporated in the test head 30, that is, the tester 20 and the test head 30 may be integrated.

EXPLANATIONS OF LETTERS OR NUMERALS

1 . . . Semiconductor wafer testing system
2 . . . Semiconductor wafer testing apparatus
20 . . . Tester
30 . . . Test head
31 . . . Frame
40 . . . Mother board
41 . . . Connector
$SP_1$ to $SP_{17}$ . . . Specific points
50 . . . Daughter board
51 . . . Connector
60 . . . Adjusting mechanism
61 . . . Holding member
62 . . . Fixing screw
63 . . . Fixed member
632 . . . Female thread portion
64 . . . Adjusting screw
644 . . . Male thread portion
70 . . . Driving device
71 . . . Worm wheel
72 . . . Worm gear
73 . . . Motor
75 . . . Controller
80 . . . Probe card
81 . . . Probe
82 . . . Wiring board
85 . . . Interposer
90 . . . Prober
100 . . . Flatness measuring device
120 . . . Measuring unit
130 . . . Moving device
140 . . . Calculating unit
200 . . . Wafer

The invention claimed is:

1. A semiconductor wafer testing apparatus that tests a device under test (DUT) on a semiconductor wafer, the semiconductor wafer testing apparatus comprising:
a first wiring board comprising first connectors and that is electrically connected to a probe card having probes that contact the DUT;
second wiring boards each comprising a second connector configured to be fitted to a respective one of the first connectors; and
adjusting mechanisms that correct a deflection of the first wiring board along a normal direction of the first wiring board with respect to a reference plane by changing a position of each of two or more of the second wiring boards along the normal direction such that the two or more of the second wiring boards push or pull the first wiring board connected to the second wiring boards through the first connectors and the second connectors.

2. The semiconductor wafer testing apparatus according to claim 1, wherein the normal direction is substantially parallel to a vertical direction of semiconductor wafer testing apparatus.

3. The semiconductor wafer testing apparatus according to claim 1, wherein
the first wiring board extends along a direction substantially perpendicular to the normal direction,
the second wiring boards extend along a direction substantially parallel to the normal direction, and
a fitting direction of the first connectors and the second connectors is substantially parallel to the normal direction.

4. The semiconductor wafer testing apparatus according to claim 1, wherein
the second wiring boards are disposed at intervals along an extending direction of the first wiring board, and
the second wiring boards are disposed in parallel to each other.

5. The semiconductor wafer testing apparatus according to claim 1, wherein each of the second wiring boards has connectors including the second connector.

6. The semiconductor wafer testing apparatus according to claim 1, wherein
each of the first connectors is a straight type connector mounted on a main surface of the first wiring board opposite to a main surface of the first wiring board on a probe card side, and
each of the second connectors is a right angle type connector mounted on a main surface of each of the second wiring boards.

7. The semiconductor wafer testing apparatus according to claim 1, wherein
each of the adjusting mechanisms comprises:
a supporting body to which the first wiring board is fixed;
a holding member disposed along an edge of one of the second wiring boards opposite to another edge of the one of the second wiring boards on a first wiring board side and held by the supporting body;
a fixed member fixed to the one of the second wiring boards and having a female thread portion; and
an adjusting screw having a male thread portion screwed with the female thread portion,
the adjusting screw is inserted into a through hole of the holding member and is held by the holding member, and
the adjusting screw is configured to be rotated to change a relative position of the one of the second wiring boards with respect to the holding member along the normal direction.

8. A method of adjusting a flatness of the first wiring board in the semiconductor wafer testing apparatus according to claim 7, the method comprising:
changing the relative position by rotating the adjusting screw.

9. The semiconductor wafer testing apparatus according to claim 1, further comprising:
a driving device that drives the adjusting mechanisms; and
a controller that controls the driving device.

10. The semiconductor wafer testing apparatus according to claim 9, further comprising:
a flatness measuring device that measures a flatness of a main surface of the first wiring board, wherein
the controller controls the driving device based on the flatness measured by the flatness measuring device.

11. The semiconductor wafer testing apparatus according to claim 10, wherein the flatness measuring device comprises:
a measuring instrument measures coordinate values along the normal direction at positions on the main surface of the first wiring board; and
a calculator that calculates differences of the coordinate values with respect to a reference plane as the flatness.

12. A semiconductor wafer testing system comprising:
the semiconductor wafer testing apparatus according to claim 1;
the probe card; and
a prober that causes the semiconductor wafer to face the probe card and presses the semiconductor wafer against the probe card.

13. A semiconductor wafer testing system comprising:
the semiconductor wafer testing apparatus according to claim 1;
a flatness measuring device that measures a flatness of a main surface of the first wiring board;
the probe card; and
a prober that causes the semiconductor wafer to face the probe card and presses the semiconductor wafer against the probe card.

14. The semiconductor wafer testing system according to claim 13, wherein the flatness measuring device comprises:
a measuring instrument measures coordinate values along the normal direction at positions on the main surface of the first wiring board; and
a calculator that calculates differences of the coordinate values with respect to a reference plane as the flatness.

15. A method of adjusting a flatness comprising:
fitting each of first connectors of a first wiring board of a semiconductor wafer testing apparatus to a respective one of second connectors on second wiring boards of the semiconductor wafer testing apparatus; and
correcting a deflection of the first wiring board along a normal direction of the first wiring board with respect to a reference plane by changing a position of each of two or more of the second wiring boards along the normal direction such that the two or more of the second wiring boards push or pull the first wiring board connected to the second wiring boards through the first connectors and the second connectors, wherein
the first wiring board is electrically connected to a probe card having probes that contacts a device under test (DUT) on a semiconductor wafer.

16. The method according to claim 15, further comprising:
measuring a flatness of a main surface of the first wiring board on a probe card side, wherein
the correcting of the deflection comprises changing the position of each of the two or more of the second wiring boards based on a measuring result in measuring the flatness.

* * * * *